(12) United States Patent
Choi et al.

(10) Patent No.: US 11,928,589 B2
(45) Date of Patent: Mar. 12, 2024

(54) IMAGE ANALYSIS APPARATUS USING MACHINE LEARNING-BASED ARTIFICIAL INTELLIGENCE INCLUDING PREPROCESSING MODULES

(71) Applicant: Korea Institute of Science and Technology, Seoul (KR)

(72) Inventors: Kihwan Choi, Seoul (KR); Jangho Kwon, Seoul (KR); Laehyun Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 54 days.

(21) Appl. No.: 17/091,143

(22) Filed: Nov. 6, 2020

(65) Prior Publication Data
US 2021/0133572 A1    May 6, 2021

(30) Foreign Application Priority Data
Nov. 6, 2019    (KR) .................. 10-2019-0140605

(51) Int. Cl.
*G06N 3/08*    (2023.01)
*G06N 3/045*    (2023.01)
(Continued)

(52) U.S. Cl.
CPC .............. *G06N 3/08* (2013.01); *G06N 3/045* (2023.01); *G06N 20/20* (2019.01); *G06V 10/764* (2022.01); *G06V 10/82* (2022.01)

(58) Field of Classification Search
CPC ........ G06N 20/00; G06N 3/0454; G06N 3/08; G06N 5/025; G06N 3/0472; G06N 7/005;
(Continued)

(56) References Cited

U.S. PATENT DOCUMENTS

2015/0370226 A1   12/2015   Kim et al.
2017/0294016 A1   10/2017   Lee et al.
(Continued)

FOREIGN PATENT DOCUMENTS

EP            3391820 A1    10/2018
KR    10-2015-0145860 A    12/2015
(Continued)

OTHER PUBLICATIONS

Sandler, M., et al., "MobileNetV2: Inverted Residuals and Linear Bottlenecks", (2019).

*Primary Examiner* — Ajibola A Akinyemi
(74) *Attorney, Agent, or Firm* — United One Law Group LLC; Kongsik Kim; Jhongwoo Peck

(57) ABSTRACT

Disclosed herein is an image preprocessing/analysis apparatus using machine learning-based artificial intelligence. The image preprocessing apparatus includes a computing system, and the computing system includes: a processor; a communication interface configured to receive an input image; and an artificial neural network configured to generate first and second preprocessing conditions through inference on the input image. The processor includes a first preprocessing module configured to generate a first preprocessed image and a second preprocessing module configured to generate a second preprocessed image. The processor is configured to control the first preprocessing module, the second preprocessing module, the artificial neural network, (Continued)

and the communication interface so that the first preprocessed image and the second preprocessed image are transferred to an image analysis module configured to perform image analysis on the input image based on the first preprocessed image and the second preprocessed image.

19 Claims, 16 Drawing Sheets

(51) Int. Cl.
    *G06N 20/20*     (2019.01)
    *G06V 10/764*     (2022.01)
    *G06V 10/82*     (2022.01)

(58) Field of Classification Search
    CPC ...... G06N 3/0481; G06N 5/022; G06N 3/084;
        G06N 20/10; G06N 3/082; G06N 3/04;
        G06N 20/20; G06N 3/0427; G06N 5/02;
        G06N 5/04; G06N 3/006; G06N 3/0445;
        G06N 3/088; G06N 5/045; G06N 3/00;
        G06N 3/02
    USPC ......................................................... 382/155
    See application file for complete search history.

(56) References Cited

U.S. PATENT DOCUMENTS

| | | | |
|---|---|---|---|
| 2017/0330319 A1 | 11/2017 | Xu et al. | |
| 2018/0032556 A1* | 2/2018 | Dominick | G16H 30/20 |
| 2020/0042796 A1 | 2/2020 | Kim et al. | |
| 2020/0104994 A1* | 4/2020 | Sharma | G06T 11/003 |
| 2020/0160530 A1* | 5/2020 | Mehnert | G05D 1/0088 |

FOREIGN PATENT DOCUMENTS

| | | |
|---|---|---|
| KR | 10-1802500 B1 | 11/2017 |
| KR | 10-1798083 B1 | 12/2017 |
| KR | 10-1857624 B1 | 5/2018 |
| KR | 101983992 B1 | 5/2019 |
| KR | 10-2019-0079047 A | 7/2019 |
| KR | 10-2019-0094133 A | 8/2019 |
| KR | 10-1971625 B1 | 8/2019 |
| KR | 10-2097905 B1 | 4/2020 |
| WO | 2017-165801 A1 | 9/2017 |
| WO | 2018-015414 A1 | 1/2018 |

* cited by examiner

FIG. 10
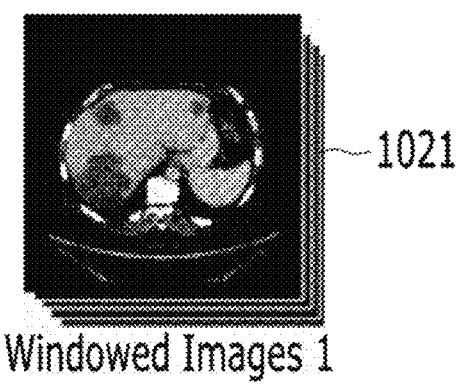
Windowed Images 1
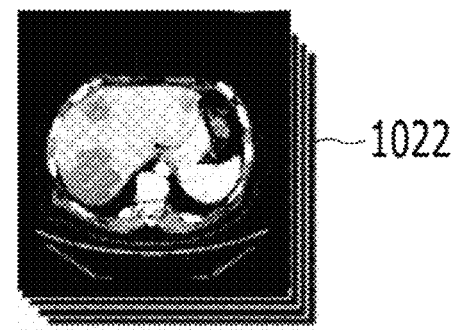
Windowed Images 2
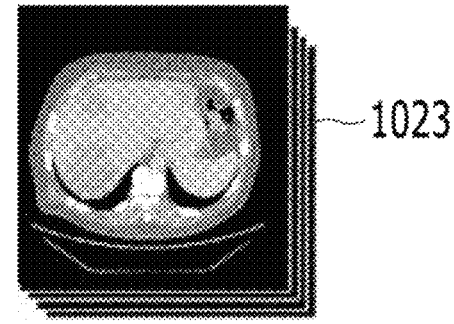
Windowed Images 3

IMAGE ANALYSIS APPARATUS USING MACHINE LEARNING-BASED ARTIFICIAL INTELLIGENCE INCLUDING PREPROCESSING MODULES

CROSS-REFERENCE TO RELATED APPLICATION

This application claims under 35 U.S.C. § 119(a) the benefit of priority to Korean Patent Application No. 10-2019-0140605 filed on Nov. 6, 2019, which is incorporated herein by reference in its entirety.

TECHNICAL FIELD

The present invention generally relates to an image analysis technique using machine learning-based artificial intelligence. More particularly, the present invention relates to an image analysis technique that applies a learning technique and a network improved over the prior art in a learning process using machine learning-based artificial intelligence, and also relates to an image analysis apparatus including a computing system to which the learning technique is applied.

BACKGROUND ART

A technology that detects a region of interest (ROI) based on the segmentation of an image is used for various purposes in image processing. In a medical image, an image is segmented based on the brightness or intensity values of the image, and a target to be segmented may be an organ or lesion of a human body.

Recently, there have been many attempts to optimize image segmentation for computed tomography (CT) images acquired as the results of computed tomography performed for precise medical diagnosis purposes.

A CT image can be represented by CT numbers. A CT number is also called a Hounsfield unit (HU), and is a numerical value representative of a radiolucent property. A CT number may be represented by an integer ranging, for example, from −1024 to 3071, and may be represented in the form of 12-bit image data. A CT image is often expressed in greyscale. A CT number (also called a Hounsfield Unit) usually are mapped to greyscale to display for a radiologist. Mapping too wide range of CT numbers leads to smaller greyscale difference, which make difficult to distinguish the difference within interest organ.

On the contrary, mapping too narrow range of CT numbers has the risk to miss important CT numbers related to interest organ. Accordingly, it is important to map greyscale with the appropriate CT number range, which includes the CT numbers of the interesting organ, and reject the CT numbers of the unrelated organ.

Furthermore, when a lesion is to be diagnosed through a medical image, it is common that the overall window area of CT numbers is not required. The window area of CT numbers for easily distinguishing a region of interest to be divided and diagnosed may be set differently according to a body part, an organ, or a lesion.

In a medical site, window level and window width frequently used in each medical institution is designated by taking into consideration the purpose of the acquisition of a CT image, i.e., detecting abnormal tissue from an organ. Accordingly, a radiologist or a clinician also preprocessed CT image for better visualization. The manpower and time required in this process are significantly burdensome.

Attempts to automate some of these processes were introduced in Korean Patent No. 10-1798083 entitled "Tomography Image Processing Apparatus, Method, and Storage Medium related thereto" and Korean Patent No. 10-1971625 entitled "Apparatus and Method for processing CT Images,"

In Korean Patent No. 10-1798083, CT numbers of interest are determined in a pixel region corresponding to a point of interest in CT image data, and a CT number range having a frequency number equal to or larger than a reference value on a histogram is set as a CT window. When two or more regions of interest are present in one CT image, different CT windows may be set for the respective regions of interest.

In Korean Patent No. 10-1971625, in a plurality of CT images corresponding to a plurality of set areas, respectively, the width and level of each CT window are set based on each setting area and an image display method, and each of the plurality of CT images is converted.

However, even according to these prior arts, the obtained CT window level and the preprocessing based on the CT window level are used merely for excluding tissues that are very unnecessary for diagnosis. This level of preprocessing is not optimized enough to have a positive effect on the final clinical diagnosis. Even after the above partially automated process, manual work by a professional is still required.

Moreover, in Korean Patent No. 10-1938992 entitled "CAD System and Method for Generating Description of Reason for Diagnosis," there was introduced a technology that generates feature vectors by concatenating feature information extracted based on a DNN in order to derive ground information for the diagnosis of a lesion. However, in Korean Patent No. 10-1938992, an artificial neural network derives feature information by itself, and no verification is made as to whether the extracted feature information is clinically useful information. Accordingly, there is little evidence that humans can recognize the above information as a description of the diagnosis result of artificial neural networks.

SUMMARY OF THE DISCLOSURE

Recently, efforts have been made to improve the performance of image analysis techniques based on image segmentation by applying deep learning-based artificial intelligence techniques. However, the possibility of using deep learning-based artificial intelligence is limited by the fact that the deep learning-based artificial intelligence corresponds to a black box because a user cannot know whether or not a result provided through operation exhibits high performance by chance or whether or not it has undergone an appropriate judgment process for a task.

In contrast, the use of a rule-based training/learning method, which is easy to explain, is limited because it does not achieve as much performance as deep learning. Accordingly, research into deep learning-based artificial intelligence that can provide descriptive information (explanation) while having improved performance is being actively conducted.

An object of the present invention is to provide an image analysis technique capable of the segmentation, detection, and even diagnosis of a lesion that may be missed when the lesion is read with the naked eye by improving the performance of an automated image analysis technique.

An object of the present invention is to implement an image analysis technique capable of providing clinically meaningful information to a medical professional as descriptive information (explanation) about image analysis, segmentation, detection, and diagnosis results.

Meanwhile, although the setting of a window level for the brightness value of an image is expected to affect the segmentation and analysis of the image, the conventional technologies are problematic in that the relevance of the setting of a window to image segmentation and analysis results is not determined. In the medical imaging field, for example, in the case of a CT window level, there is needed more research into the relevance leading to the effectiveness of clinical diagnosis. The conventional CT window level focuses only on automation and modularization by adapting the conventional rule-based method or simple deep learning, and thus there is no means for determining whether it is effective when it is associated with clinical diagnosis.

An object of the present invention is to improve the completeness of an automated preprocessing process by optimizing the process of preprocessing the window levels of an image.

An object of the present invention is to provide image preprocessing conditions capable of improving the performance of an image analysis module or an image analysis artificial neural network.

An object of the present invention is to provide a preprocessing process in which window levels obtained by an automated preprocessing process for medical images are clinically optimized to have a positive effect on diagnosis.

An object of the present invention is to provide a preprocessed image set capable of improving the performance of an image analysis module or an image analysis artificial neural network.

An object of the present invention is to train an image analysis artificial neural network and a window level preprocessing module together in a learning process and improve the performance of both the preprocessing module and the artificial neural network so that window levels highly related to a task performed by the artificial neural network can be obtained.

An object of the present invention is to design a plurality of preprocessing modules to operate independently of each other and in parallel so that robustness can be ensured against the influence of the designation of an initial value on diagnosis accuracy and the problem of not finding a global optimum due to a local optimum.

An object of the present invention is to derive preprocessing conditions suitable for an image analysis artificial neural network to solve a problem as descriptive information that allows a process in which the image analysis artificial neural network internally solves the problem to be understood from the outside and at least partially explain the process in which the analysis artificial neural network solves the problem based on the preprocessing conditions.

Moreover, an object of the present invention is not to be limited to deriving descriptive information by simply analyzing a heat map or the like derived in the analysis process of an artificial neural network, unlike the conventional technologies and to allow the effect of results, obtained by the generative artificial neural network of the present invention, on the analysis process of the artificial neural network to be observed, thereby enabling reliable descriptive information to be generated through the verification of the results.

According to an aspect of the present invention, there is provided an image preprocessing apparatus using machine learning-based artificial intelligence, the image preprocessing apparatus including a computing system, the computing system including: a processor; a communication interface configured to receive an input image; and an artificial neural network configured to generate first and second preprocessing conditions through inference on the input image. The processor includes: a first preprocessing module configured to generate a first preprocessed image by applying the first preprocessing condition to the input image; and a second preprocessing module configured to generate a second preprocessed image by applying the second preprocessing condition to the input image. The processor is configured to control the first preprocessing module, the second preprocessing module, the artificial neural network, and the communication interface so that the first preprocessed image and the second preprocessed image are transferred to an image analysis module configured to perform image analysis on the input image based on the first preprocessed image and the second preprocessed image.

The processor may be further configured to transfer the feedback of an objective function output of the image analysis module and the training input image to the artificial neural network so that the artificial neural network and the image analysis module can train together for a correlation between the training input image and the result of the analysis of the training input image, and to control the artificial neural network and the image analysis module so that the artificial neural network can train along with the image analysis module.

The computing system may further include the image analysis module.

The communication interface may be further configured to transmit the first preprocessed image and the second preprocessed image to the image analysis module outside the computing system. The communication interface may receive the training input image and the feedback of an objective function output of the image analysis module and transfer them to the artificial neural network so that the artificial neural network and the image analysis module can train together for a correlation between the training input image and the result of the analysis of the training input image.

The processor may control the artificial neural network so that the artificial neural network can train along with the image analysis module, and may control the image analysis module via the communication interface.

The first preprocessing condition may be a first window level including information about the upper and lower limits of the brightness values of the input image. The second preprocessing condition may be a second window level including information about the upper and lower limits of the brightness values of the input image.

The input image may be an image acquired by a modality including at least one of X-ray imaging, computed tomography (CT), magnetic resonance imaging (MRI), ultrasonic imaging, positron emission tomography (PET), and single photon emission computed tomography (SPECT).

The image analysis module may be a module configured to perform a task including at least one of image segmentation, object detection, diagnosis, quantification, and image analysis for the input image.

The artificial neural network may generate a third preprocessing condition through inference on the input image. In this case, the processor may further include a third preprocessing module configured to generate a third preprocessed image by applying the third preprocessing condition to the input image. The processor may control the first preprocessing module, the second preprocessing module, the third preprocessing module, the artificial neural network, and the communication interface so that the first preprocessed image, the second preprocessed image, and the third preprocessed image can be transferred to the image analysis module.

The first and second preprocessing modules may be further configured to operate independently of each other.

The processor may be further configured to provide the first and second preprocessing conditions to a user as descriptive information about at least one of the input image, the first preprocessed image, the second preprocessed image, the image analysis module, and the result of the analysis of the input image obtained by the image analysis module.

According to another aspect of the present invention, there is provided an image analysis support apparatus using machine learning-based artificial intelligence, the image analysis support apparatus including a computing system, the computing system including: a processor; a communication interface configured to receive an input image; and an artificial neural network configured to generate first and second preprocessing conditions through inference on the input image. The processor is configured to control the artificial neural network and the communication interface so that the first preprocessing condition is transferred to a first preprocessing module configured to generate a first preprocessed image by applying the first preprocessing condition to the input image and the second preprocessing condition is transferred to a second preprocessing module configured to generate a second preprocessed image by applying the second preprocessing condition to the input image. The processor is further configured to control, via the communication interface, the first preprocessing module, the second preprocessing module, and an image analysis module configured to perform image analysis on the input image based on the first preprocessed image and the second preprocessed image so that the first preprocessed image and the second preprocessed image are transferred to the image analysis module.

The processor may be further configured to transfer the feedback of an objective function output of the image analysis module and the training input image to the artificial neural network so that the artificial neural network and the image analysis module can train together for a correlation between the training input image and the result of the analysis of the training input image, and to control the artificial neural network and the image analysis module so that the artificial neural network can train along with the image analysis module.

The processor may be further configured to provide the first and second preprocessing conditions to a user as descriptive information about at least one of the input image, the first preprocessed image, the second preprocessed image, the image analysis module, and the result of the analysis of the input image obtained by the image analysis module.

According to still another aspect of the present invention, there is provided an image analysis apparatus using machine learning-based artificial intelligence, the image analysis apparatus including a computing system, the computing system including: a processor; a communication interface configured to receive an input image; a first artificial neural network configured to generate first and second preprocessing conditions through inference on the input image; and a second artificial neural network configured to generate a result of an analysis of the input image by performing image analysis on the input image. The processor includes: a first preprocessing module configured to generate a first preprocessed image by applying the first preprocessing condition to the input image; and a second preprocessing module configured to generate a second preprocessed image by applying the second preprocessing condition to the input image. The processor is configured to control the first preprocessing module, the second preprocessing module, the first artificial neural network, the second artificial neural network, and the communication interface so that the first and second preprocessed images are transferred to the second artificial neural network and the second artificial neural network generates the result of the analysis of the input image based on the first and second preprocessed images.

The processor may be further configured to transfer the feedback of an objective function output of the second artificial neural network and the training input image to the first artificial neural network so that the first and second artificial neural networks can train together for a correlation between the training input image and the result of the analysis of the training input image, and to control the first and second artificial neural networks so that the first artificial neural network can train along with the second artificial neural network.

The second artificial neural network may be an artificial neural network configured to perform a task including at least one of image segmentation, object detection, diagnosis, quantification, and image analysis for the input image.

The processor may be further configured to provide the first and second preprocessing conditions to a user as descriptive information about at least one of the input image, the first preprocessed image, the second preprocessed image, and the result of the analysis of the input image obtained by the second artificial neural network.

BRIEF DESCRIPTION OF THE DRAWINGS

The above and other objects, features and advantages of the present invention will be more clearly understood from the following detailed description taken in conjunction with the accompanying drawings, in which:

FIG. 10 is a diagram showing an example of windowed images generated by a plurality of windowing preprocessing modules according to an embodiment of the present invention;

DETAILED DESCRIPTION OF THE DISCLOSURE

Figure 1:
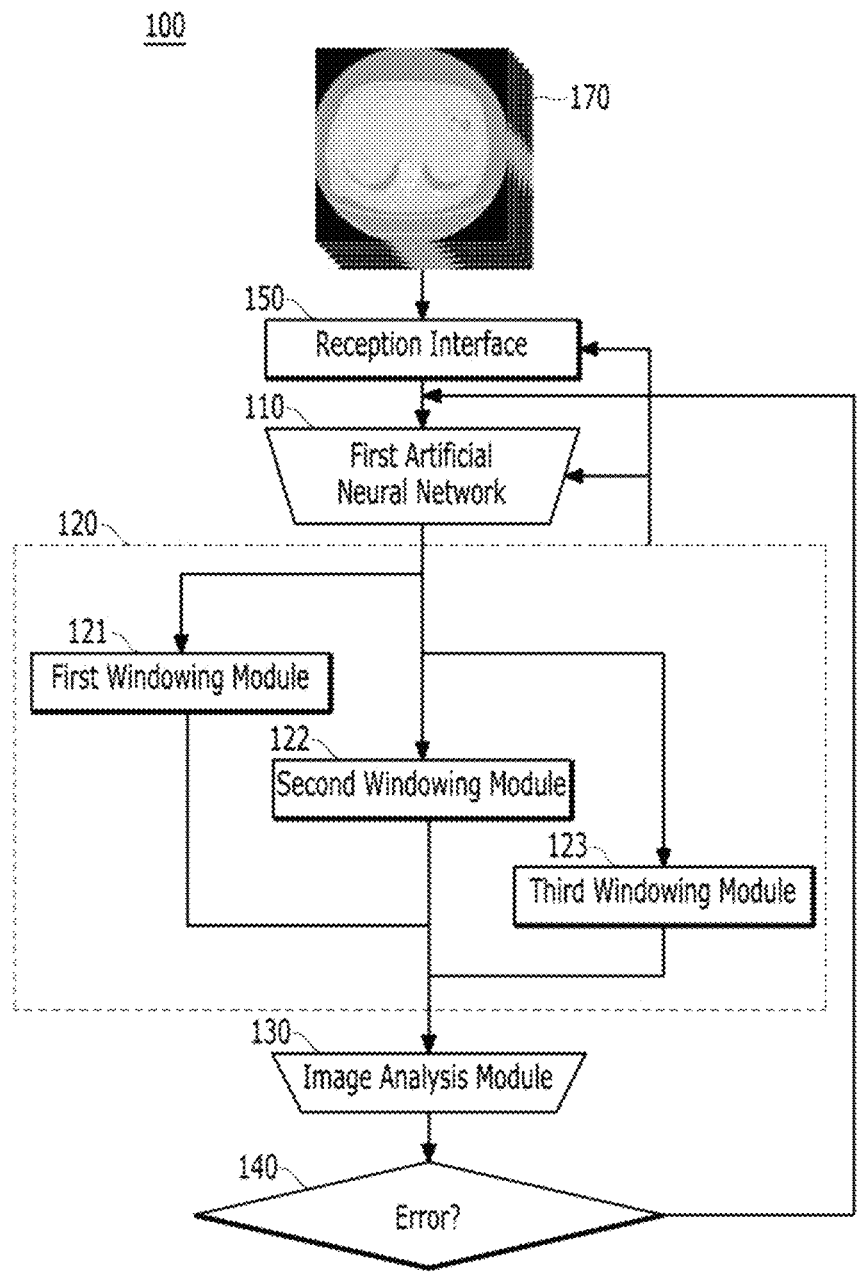
FIG. 1 is a diagram showing the training/learning process of an image preprocessing and analysis apparatus using machine learning-based artificial intelligence according to an embodiment of the present invention.

Other objects and features of the present invention in addition to the above objects will be apparent from the following description of embodiments with reference to the accompanying drawings.

Embodiments of the present invention will be described in detail below with reference to the accompanying drawings. In the following description, when it is determined that a detailed description of a related known component or function may unnecessarily make the gist of the present invention obscure, it will be omitted.

An internal process in which an artificial neural network solves a given problem is not known in detail. In particular, the insides of deep learning and convolutional neural networks (CNNs), which have dramatically improved performance in image segmentation and image processing recently, are close to black boxes. Accordingly, there is reluctance for a user to fully accept and adopt acquired results even when they are excellent.

Against this backdrop, research into explainable artificial intelligence (X-AI) has been attempted in the Defense Advanced Research and Planning (DARPA) of the U.S., etc. (see https://www.darpa.mil/program/explainable-artificial-intelligence). However, no visible results have yet been revealed.

Although it is expected that recent deep learning/CNN-based artificial neural networks and later researched artificial neural networks such as V-NET, U-NET, and RNN divide a given problem into a plurality of tasks and then deal with the plurality of tasks, information on parameters that influence the respective tasks has not yet been fully studied.

The present invention was derived based on improvement in the performance of an artificial neural network and preprocessing modules achieved by training the artificial neural network and the preprocessing modules together. It was confirmed that the performance of the image processing (mainly image segmentation and region-of-interest detection in the present invention) of the artificial neural network was improved by training the artificial neural network and the preprocessing modules together.

In this process, the present invention acquired more advanced results during a process of implementing a plurality of preprocessing modules in parallel and independently of each other in order to improve the performance of an artificial neural network and to avoid a case where the designation of the initial value of each preprocessing module is limited to a local optimum outside an optimized range.

The present invention was conceived based on the facts that the artificial neural network derived results in which the plurality of preprocessing modules were optimized for each task in different manners to solve a problem given to the artificial neural network by using the plurality of preprocessing modules and based on this, the parameters obtained by the plurality of preprocessing modules through learning might be used as a key to understanding the internal operation of the artificial neural network.

By utilizing the present invention, a user may become aware of the individual tasks into which a problem given to an artificial neural network is divided by the artificial neural network in order to solve the problem. Furthermore, the user may also receive the results in which the artificial neural network optimizes the preprocessing modules for each task as related information, thereby making it possible to check whether image segmentation, the detection of a region of interest, and related medical diagnosis results presented by the artificial neural network are accompanied by clinically significant results.

An image analysis apparatus and method using machine learning-based artificial intelligence according to embodiments of the present invention will be described in detail below with reference to FIGS. 1 to 14.

FIG. 1 is a diagram showing the training/learning process of an image preprocessing and analysis apparatus using machine learning-based artificial intelligence according to an embodiment of the present invention.

Referring to FIG. 1, the image preprocessing and analysis apparatus includes a computing system 100. The computing system 100 includes a reception interface 150, a first artificial neural network 110, a processor 120, an image analysis module 130, and an objective function logic 140. The processor 120 includes a first preprocessing module 121, a second preprocessing module 122, and a third preprocessing module 123. The processor 120 may control the first artificial neural network 110 and the reception interface 150.

A training input image 170 is a medical image. Although a computed tomography (CT) image is mainly referred to below for ease of description, the training input image 170 is not limited to a CT image, but may be an image acquired by a modality including at least one of X-ray imaging, computed tomography (CT), magnetic resonance imaging (MRI), ultrasonic imaging, positron emission tomography (PET), and single photon emission computed tomography (SPECT). Those that are presented here are merely examples, and any medical image acquired by any modality may be applicable to the present invention as long as it includes the anatomical information of a human body.

The training input image 170 may be transferred to the first artificial neural network 110 via the reception interface 150. In this case, according to one embodiment of the present invention, the original image of the training input image 170 may be also transferred to the image analysis module 130. Alternatively, according to another embodiment of the present invention, images preprocessed by the plurality of preprocessing modules 121, 122 and 123 may be transferred to the image analysis module 130 as the training input image 170. In either case, the image analysis module 130 may perform image analysis based on the training input image 170.

The first artificial neural network 110 may generate a first preprocessing condition, a second preprocessing condition, and a third preprocessing condition through inference on the training input image 170. The first preprocessing condition is intended for the first preprocessing module 121, the second preprocessing condition is intended for the second preprocessing module 122, and the third preprocessing condition is intended for the third preprocessing module 123. Each of the preprocessing conditions may be windowing information including the upper and lower limits of the brightness values of the training input image 170, and may be defined by a central level and a width instead of being bounded by the upper and lower limits.

The image analysis module 130 is a module configured to derive an analysis result by performing image analysis on the training input image 170. The image analysis module 130 may be a module configured to perform a task including at least one of image segmentation, object detection, diagnosis, quantification, and image analysis on the training input image 170.

The image analysis module 130 may be implemented as an artificial neural network, and may be implemented in a rule-based manner. Furthermore, the image analysis module 130 may be a module formed through learning or training, and may be a module having parameters fixed from the beginning.

Figure 2:
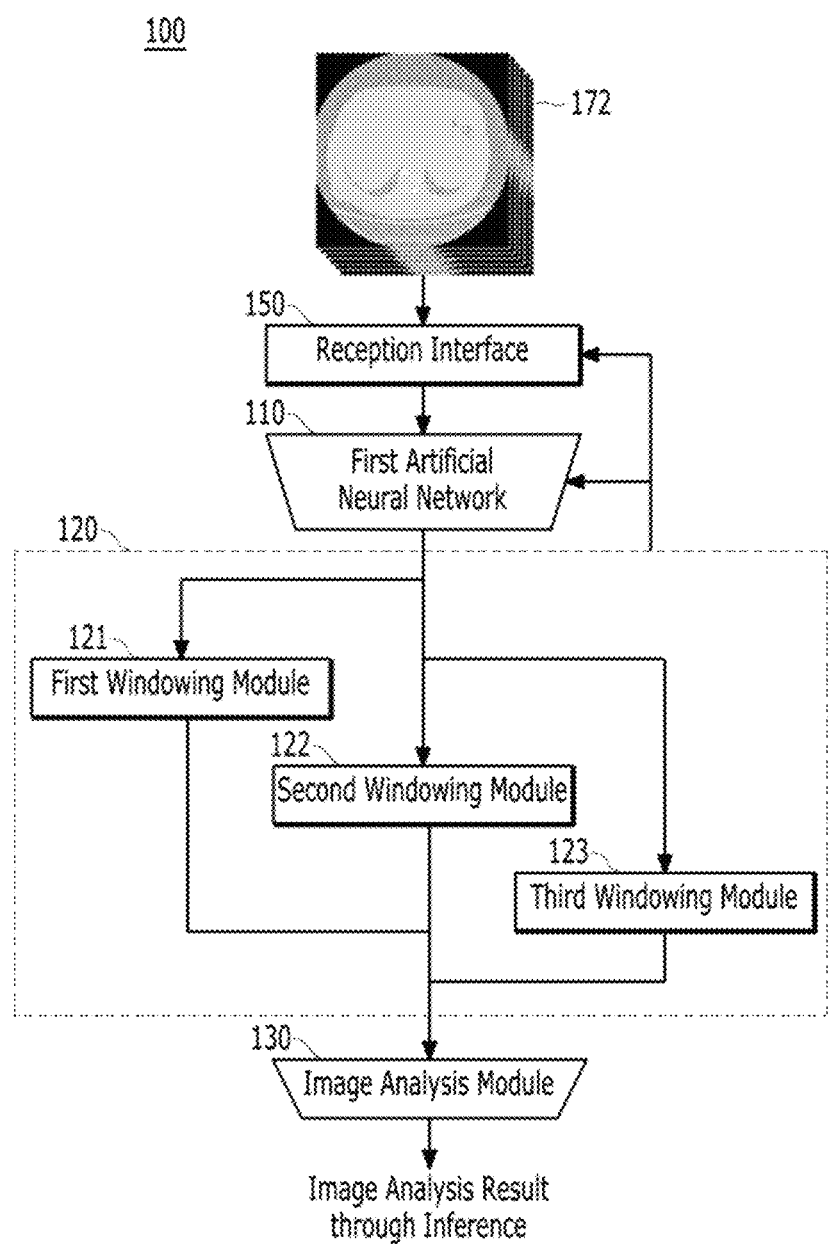
FIG. 2 is a diagram showing an inference process using the image preprocessing and analysis apparatus of FIG. 1.
Figure 7:
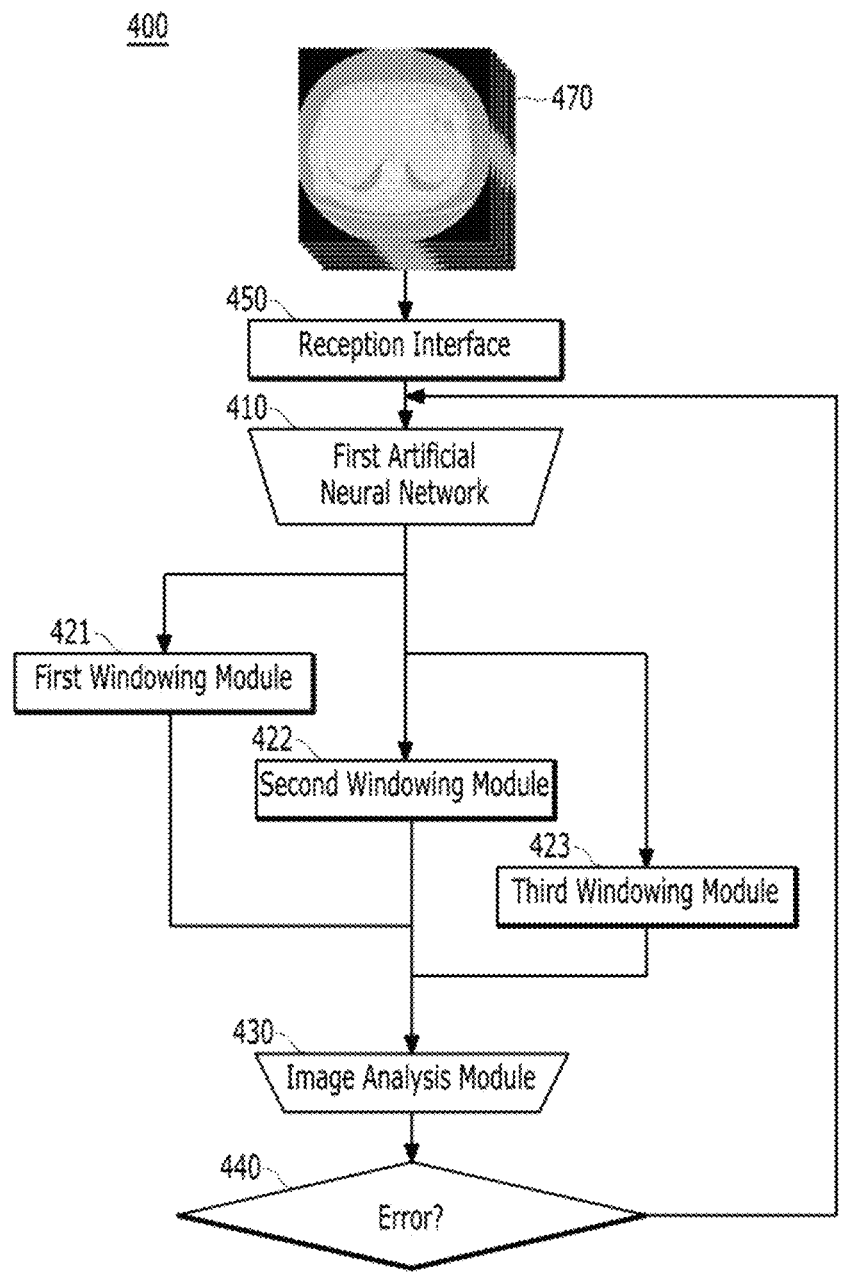
FIG. 7 is a diagram showing the training/learning process of an image analysis apparatus using machine learning-based artificial intelligence according to an embodiment of the present invention.
Figure 8:
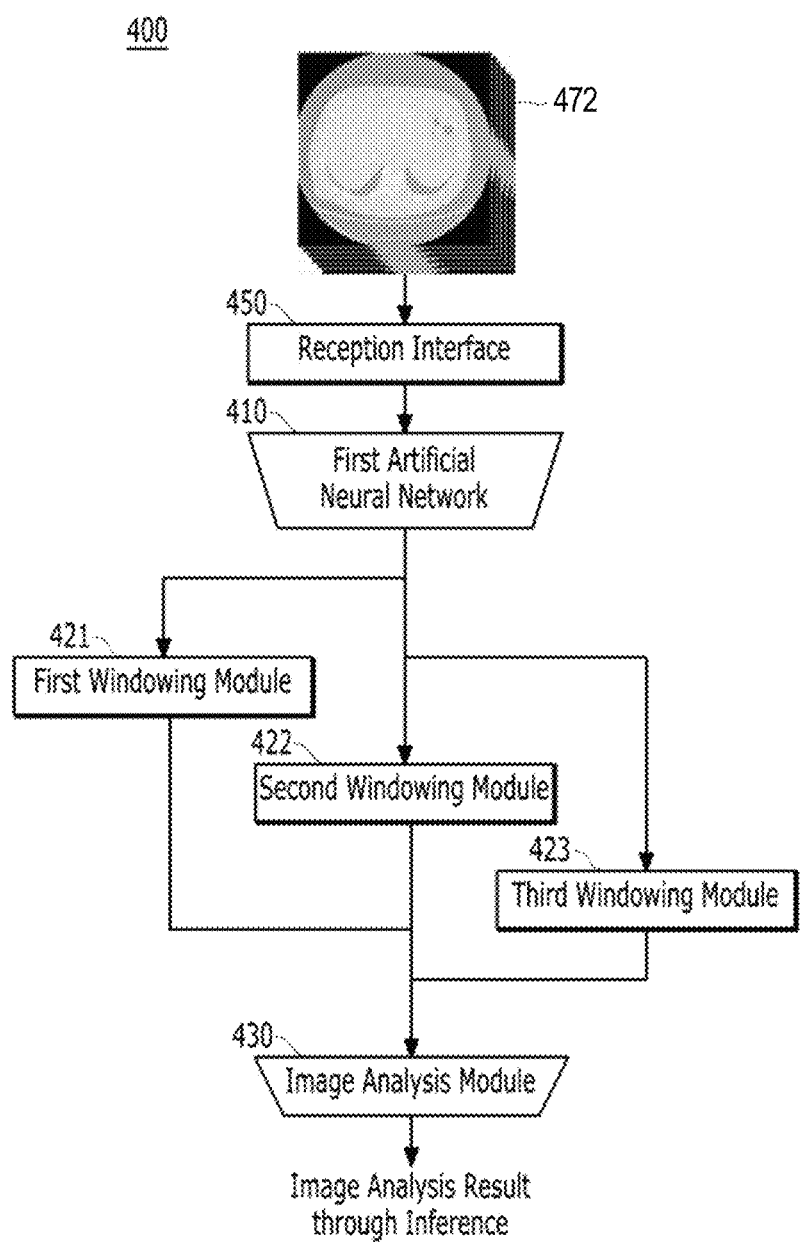
FIG. 8 is a diagram showing an inference process using the image analysis device of FIG. 7.

Although the image analysis module 130 is implemented as an artificial neural network in the embodiment of the present invention shown in FIG. 1, it is assumed that training input images have been already learned and thus fixed internal parameters are provided. In this case, the training/learning process of the embodiment of FIG. 1 is not a process for training the image analysis module 130, but is a process for training the first artificial neural network 110. In FIGS. 7 and 8 to be described later, there is shown an embodiment in which the image analysis module 130 of FIGS. 1 and 2 is replaced with a second artificial neural network 430 and the second artificial neural network 430 is trained along with the first artificial neural network 410 of FIGS. 7 and 8.

Referring back to FIG. 1, the first artificial neural network 110 generates the preprocessing conditions used in the preprocessing processes performed by the plurality of preprocessing modules 121, 122 and 123. In this case, the first artificial neural network 110 may be a generative artificial neural network. The first artificial neural network 110 generates the preprocessing conditions based on the training input image 170.

The preprocessing conditions generated by the first artificial neural network 110 are transferred to the plurality of preprocessing modules 121, 122 and 123 by the processor 120. The first preprocessing module 121 generates a first preprocessed image by preprocessing the training input image 170 using the first preprocessing condition, the second preprocessing module 122 generates a second preprocessed image by preprocessing the training input image 170 using the second preprocessing condition, and the third preprocessing module 123 generates a third preprocessed image by preprocessing the training input image 170 using the third preprocessing condition.

The first, second and third preprocessed images are input to the image analysis module 130, and the image analysis module 130 drives the result of the analysis of the training input image 170 based on the first, second, and third preprocessed images. The processor 120 may control the preprocessing modules 121, 122 and 123 and the image analysis module 130 so that the first, second, and third preprocessed images can be transferred to the image analysis module 130. In this case, the first, second, and third preprocessed images are formed based on the training input image 170, and the first, second, and third preprocessed images are also related to the label information to which the training input image 170 is related. The objective function logic 140 makes a decision on the analysis result based on the analysis result of the image analysis module 130 and the label information to which the training input image 170 is related, or based on the first, second, and third preprocessed images and the label information (acquired based on the label information of the training input image 170). Information about whether or not the decision on the analysis result satisfies a reference condition set by the objective function logic 140 is transmitted to the first artificial neural network 110 as the feedback information of the objective function logic 140.

The first, second, and third preprocessed images are windowed images preprocessed based on windowing information. According to one embodiment, the windowed images may be directly transmitted to the image analysis module 130, or may be processed into a form that is easy for the image analysis module 130 to process and transmitted to the image analysis module 130. An embodiment related to this is introduced in FIG. 11 to be described later.

The first artificial neural network 110 provides support by generating windowing information to be executed by the preprocessing modules 121, 122 and 123 so that the image analysis module 130 can improve the performance of the image analysis of the training input image 170. The first generative artificial neural network 110 may provide windowing information to be executed by the preprocessing modules 121, 122 and 123 as descriptive information about the image analysis process performed on the training input image 170 by the image analysis module 130 and about the result of the analysis of the training input image 170 provided by the image analysis module 130.

According to one embodiment, the reference condition of the objective function logic 140 may be set such that the image analysis module 130 has target performance higher than the target performance reached in an initial training process. In this case, windowing information may be used as descriptive information on the factors for which the first artificial neural network 110 contributed to improvement in the performance of the image analysis module 130.

When the image analysis module 130 performs an image segmentation task, the similarity between a region of interest derived from the analysis result of the image analysis module 130 and a reference region of interest intended for the training input image 170 may be the reference condition of the objective function logic 140. When the image analysis module 110 performs an object detection task, the similarity between the number and locations of ROIs derived as the analysis result of the image analysis module 130 and the number and locations of reference ROIs intended for the training input image 170 may be the reference condition of the objective function logic 140. Moreover, when the image analysis module 130 performs a task for the diagnosis or quantification of a lesion, the accuracy between the diagnosis or quantification result of the image analysis module 130 and a reference diagnosis or quantification result may be the reference condition of the objective function logic 140.

In the computing system 100 of the image preprocessing and analysis apparatus of FIG. 1, under the control of the processor 120, the first artificial neural network 110, the preprocessing modules 121, 122 and 123, the image analysis module 130, and the objective function logic 140 form the feedback loop of a training/learning process together to allow training/learning to be performed for a correlation between the training input image 170 and the result of the analysis of the training input image 170. The training input image 170 is transmitted as an input of the first artificial neural network 110 and applied as a basis for generating preprocessing conditions. In the feedback loop, the feedback of the output of the objective function logic 140 is transmitted to the first artificial neural network 110. The processor 120 may control data transfer paths and feedback transfer paths between the first artificial neural network 110, the preprocessing modules 121, 122 and 123, the image analysis module 130, and the objective function logic 140.

The first preprocessing module 121, the second preprocessing module 122, and the third preprocessing module 123 operate independently of each other. Furthermore, the first artificial neural network 110 simultaneously generates the preprocessing conditions of the respective preprocessing modules 121, 122 and 123 for all the preprocessing modules 121, 122 and 123. After the preprocessing conditions have been generated, the preprocessing conditions are transmitted to the preprocessing modules 121, 122 and 123, respectively, and the operations of the preprocessing modules 121, 122 and 123 are independent of each other.

FIG. 2 is a diagram showing an inference process using the image preprocessing and analysis apparatus of FIG. 1. The input image 172 of FIG. 2 is a new input for new analysis and inference.

The reception interface 150 receives the input image 172.

The first artificial neural network 110 generates the first, second, and third preprocessing conditions through inference on the input image 172.

The preprocessing modules 121, 122 and 123 inside the processor 120 generate first, second, and third preprocessed images by applying the preprocessing conditions, allocated thereinto, to the input image 172.

The processor 120 may control the first artificial neural network 110, the preprocessing modules 121, 122 and 123, and the image analysis module 130 so that the first preprocessed image generated in such a manner that the first preprocessing module 121 applies the first preprocessing condition to the input image 172, the second preprocessed image generated in such a manner that the second preprocessing module 122 applies the second preprocessing condition to the input image 172, and the third preprocessed image generated in such a manner that the third preprocessing module 123 applies the third preprocessing condition to the input image 172 can be transmitted to the image analysis module 130.

The processor 120 may provide the first preprocessing condition, the second preprocessing condition, and the third preprocessing condition to a user as descriptive information about at least one of the input image 172, the first preprocessed image, the second preprocessed image, the third preprocessed image, the image analysis module 130, and the analysis result of the image analysis module 130 for the input image 172.

Since the preprocessing conditions and windowing information derived by the first artificial neural network 110 for the input image 172 may be preprocessing conditions derived so that the image analysis module 130 can effectively analyze the input image 172, they may be interpreted as descriptive information about a disease and a lesion included in the input image 172 or descriptive information that allows a process and a means in and by which for the image analysis module 130 analyzes the input image 172 to be viewed from the outside. Furthermore, they may be interpreted as descriptive information about a process in which preprocessed images for improvement in the performance of the image analysis module 130 are derived and a means for the improvement in the performance of the image analysis module 130.

In the embodiments of FIGS. 1 and 2, the image analysis module 130 is included in the computing system 100. Furthermore, although not shown, a transmission interface (not shown) capable of transmitting data and information out of the computing system 100 may be further included in the computing system 100. The reception interface 150 and the transmission interface may be integrated into a single module and constitute a "communication interface."

Figure 3:
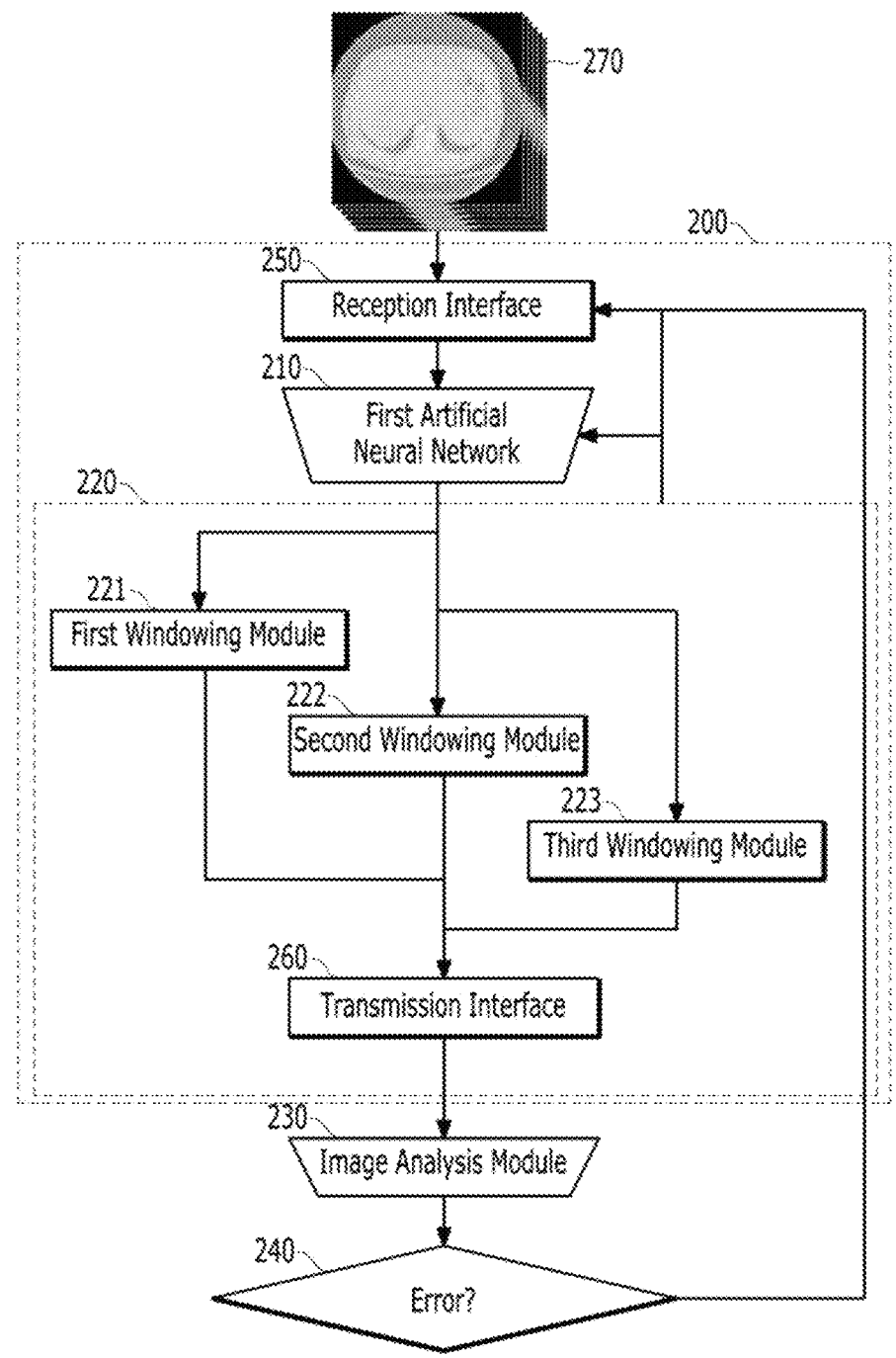
FIG. 3 is a diagram showing the training/learning process of an image preprocessing apparatus using machine learning-based artificial intelligence according to an embodiment of the present invention.

FIG. 3 is a diagram showing the training/learning process of an image preprocessing apparatus using machine learning-based artificial intelligence according to an embodiment of the present invention.

Referring to FIG. 3, the image preprocessing apparatus includes a computing system 200. The computing system 200 includes a reception interface 250, a first artificial neural network 210, a processor 220, and a transmission interface 260. In order to communicate with the image analysis module 230 and the objective function logic 240 outside the computing system 200, or to control the image analysis module 230 and the objective function logic 240, the processor 220 includes the reception interface 250 and the transmission interface 260. According to one embodiment, the reception interface 250 and the transmission interface 260 may be integrated into a single module and function as a "communication interface."

The processor 220 includes a first preprocessing module 221, a second preprocessing module 222, and a third preprocessing module 223. The processor 220 may control the first, second and third artificial neural networks 210, 250 and 260.

The transmission interface 260 transmits a first preprocessed image, a second preprocessed image, and a third preprocessed image to the image analysis module 230 outside the computing system 200.

The reception interface 250 may receive the feedback of the output of the objective function logic 240 for the training input image 270 and the analysis result of the image analysis module 230 for the training input image 270 and transmit the feedback to the first artificial neural network 210 so that the first artificial neural network 210 and the image analysis module 230 can train together for a correlation between the training input image 270 and the result of the analysis of the training input image 270.

The processor 210 may control the first artificial neural network 210 so that the first artificial neural network 210 trains along with the image analysis module 230, and may control the image analysis module 230 and the objective function logic 240 via the reception interface 250 and the transmission interface 260.

The computing system 200 of FIG. 3 generates first, second, and third preprocessed images for the image analysis module 230 by the training of the first artificial neural network 210. In this case, the first, second, and third preprocessed images are generated based on the training input image 270 and first, second, and third preprocessing conditions.

A process in which the first artificial neural network 210 performs training/learning so that the first artificial neural network 210 can derive the preprocessing conditions for the image analysis module 230 is executed in a feedback loop that is formed by the reception interface 250, the first artificial neural network 210, the processor 220, the first preprocessing module 221, the second preprocessing module 222, the third preprocessing module 223, transmission interface 260, the image analysis module 230, and the objective function logic 240.

Figure 4:
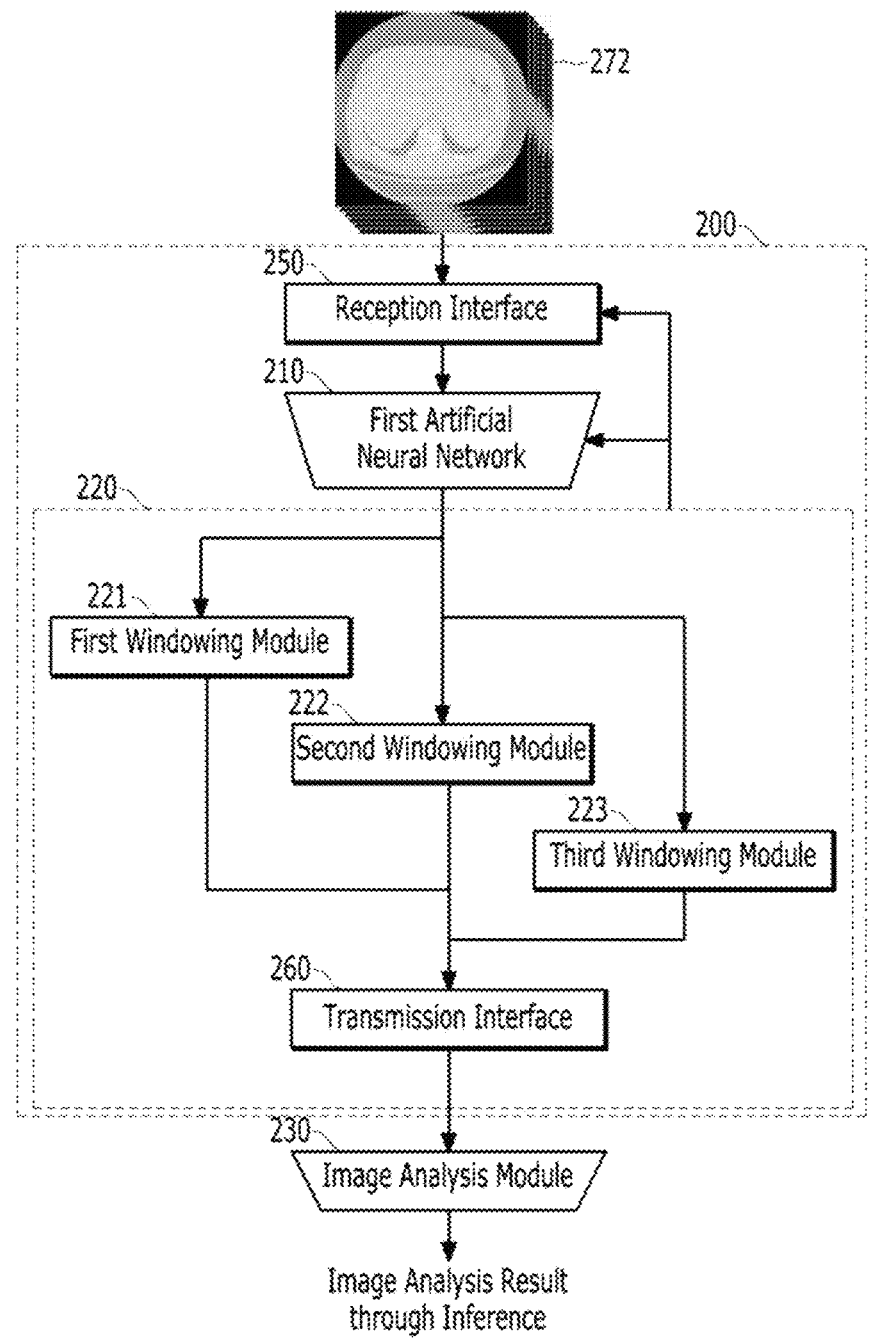
FIG. 4 is a diagram showing an inference process using the image preprocessing apparatus of FIG. 3.

FIG. 4 is a diagram showing an inference process using the image preprocessing apparatus of FIG. 3.

In FIG. 4, since the operations in which a reception interface 250 receives an input image 272, a first artificial neural network 210 generates first, second, and third preprocessing conditions based on the input image 272, preprocessing modules 221, 222 and 223 inside the processor 220 generate first, second, and third preprocessed images, respectively, by applying the first, second, and third preprocessing conditions to the input image 272, and an image analysis module 230 receives the first, second, and third preprocessed images and derives an image analysis result through inference as an image analysis result for the input image 272 are similar to the operations described in FIG. 2, redundant descriptions thereof will be omitted below.

The configuration of FIG. 4 is considerably similar to that of FIG. 2 except that the transmission interface 260 transmits the first, second, and third preprocessed images to the image analysis module 230 outside the computing system 200.

Figure 5:
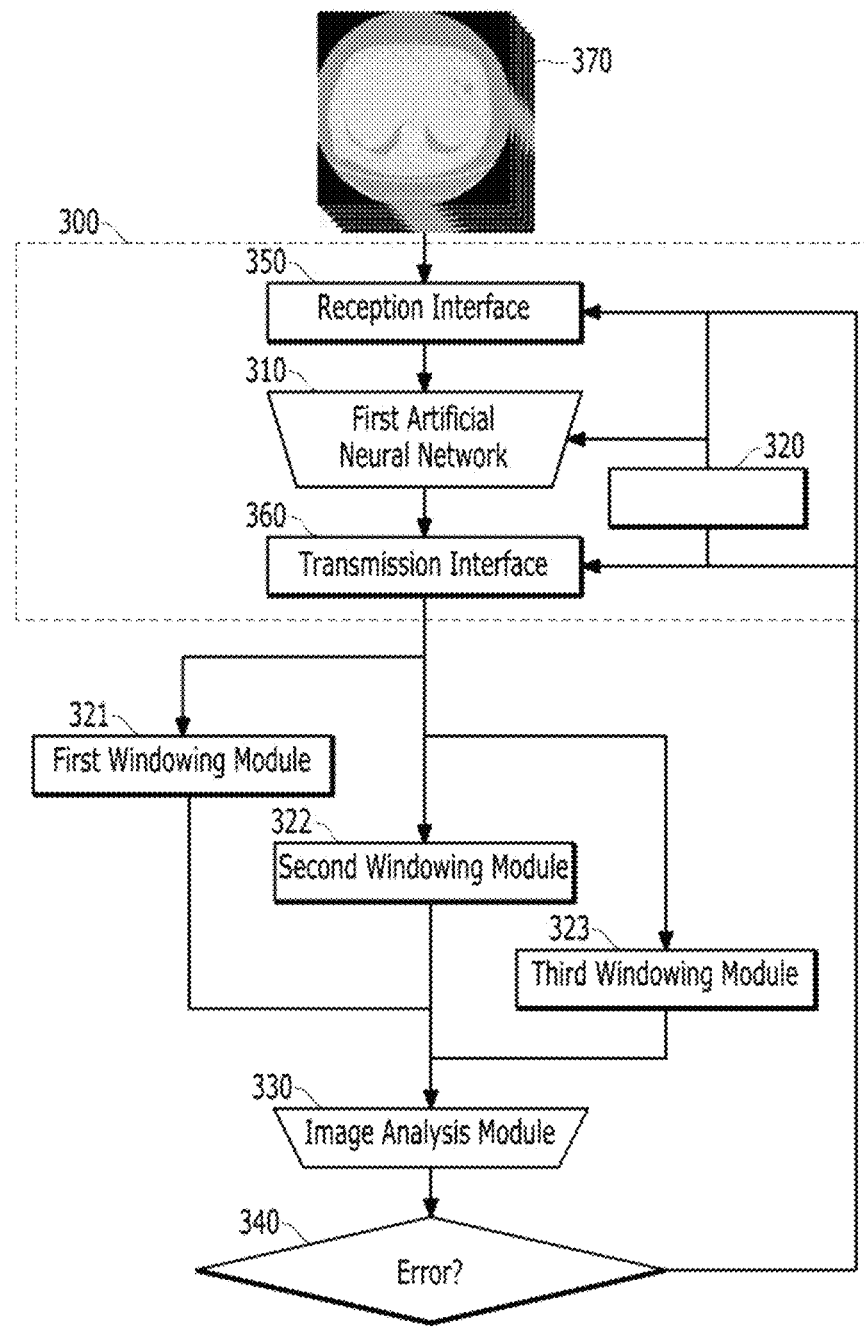
FIG. 5 is a diagram showing the training/learning process of an image analysis support apparatus using machine learning-based artificial intelligence according to an embodiment of the present invention.

FIG. 5 is a diagram showing the training/learning process of an image analysis support apparatus using machine learning-based artificial intelligence according to an embodiment of the present invention.

Since the configurations in the based on a training input image 370, a reception interface 350, a first artificial neural network 310, a first preprocessing module 321, a second preprocessing module 322, a third preprocessing module 323, an image analysis module 330, and an objective function logic 340 form a feedback loop and the first artificial neural network 310 and the image analysis module 330 perform training/learning for a correlation between the training input image 370 and the result of the reference analysis of the training input image are the same as those in the embodiments of FIGS. 1 and 3, redundant descriptions thereof will be omitted below.

Although the image analysis module 330 participates in the training/learning process of the first artificial neural network 310 together, the image analysis module 330 may have already completed training/learning, and the internal parameters of the image analysis module 330 may be in a fixed state. In this case, the substantial object of the training/learning is the first artificial neural network 310.

In the embodiment of FIG. 5, the transmission interface 360 transmits a first preprocessing condition to a first preprocessing module 321 outside the computing system 300, a second preprocessing condition to a second preprocessing module 322 outside the system 300 and a third preprocessing condition to a third preprocessing module 323 outside the computing system 300 under the control of the processor 320.

Since the feedback loop for the training/learning of the first artificial neural network 310 includes the preprocessing modules 321, 322 and 323, the image analysis module 330 and the objective function logic 340 outside the computing system 300, the processor 320 may control the preprocessing modules 321, 322 and 323, the image analysis module 330 and the objective function logic 340 outside the computing system 300 via the reception interface 350 and the transmission interface 360.

It is assumed that the first artificial neural network 310 recognizes the number of preprocessing modules 321, 322 and 323 outside the computing system 300 in advance.

Figure 6:
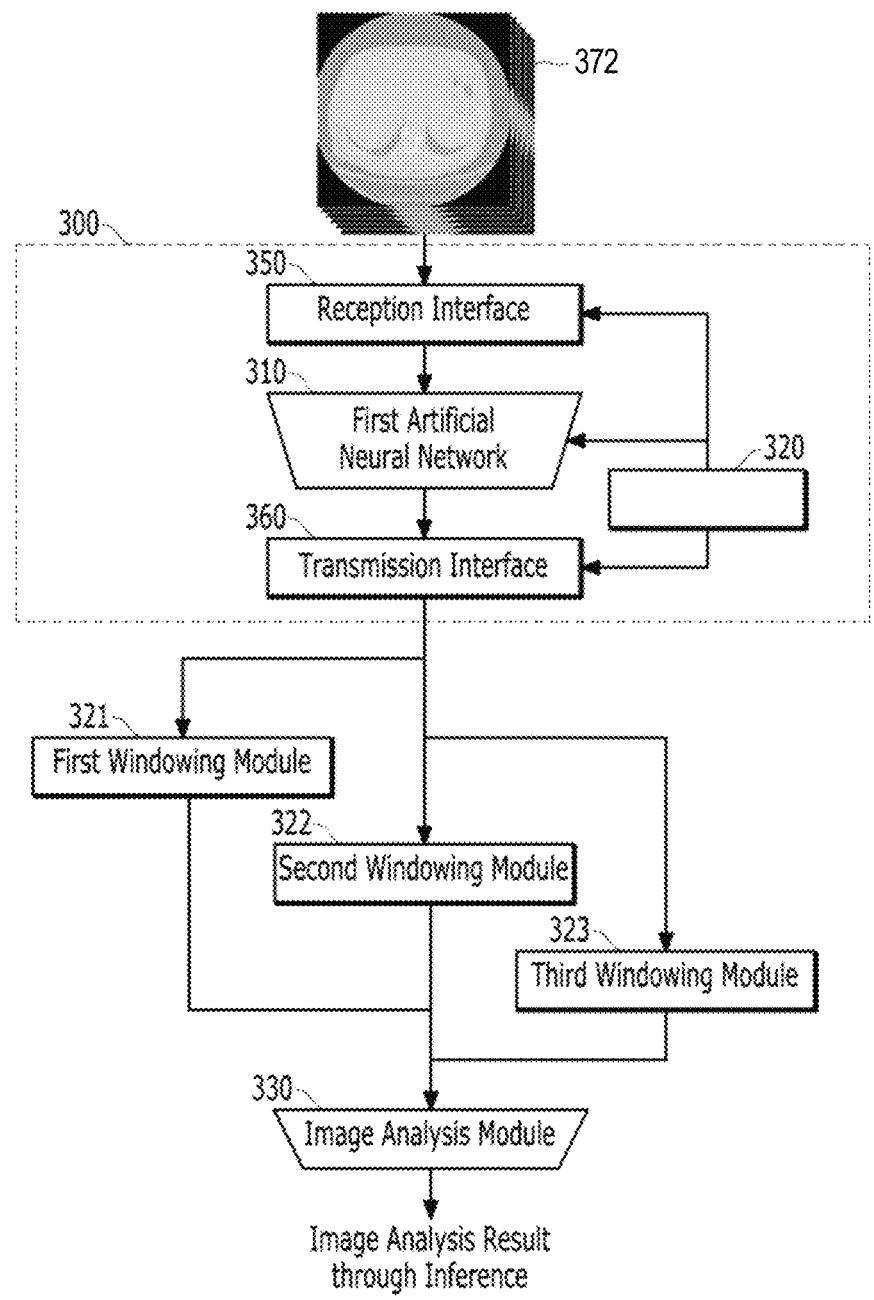
FIG. 6 is a diagram showing an inference process using the image analysis support apparatus of FIG. 5.

FIG. 6 is a diagram showing an inference process using the image analysis support apparatus of FIG. 5.

In FIG. 6, since the operations in which a reception interface 350 receives an input image 372, a first artificial neural network 210 generates first, second, and third preprocessing conditions based on the input image 372, reprocessing modules 321, 322 and 323 generate first, second, and third preprocessed images, respectively, by applying the first, second, and third preprocessing conditions to the input image 372, and an image analysis module 330 receives the first, second, and third preprocessed images and derives an image analysis result through inference as an image analysis result for the input image 372 are similar to the operations described in FIGS. 2 and 4, redundant descriptions thereof will be omitted below.

The configuration of FIG. 6 is considerably similar to those of FIGS. 2 and 4 except that the transmission interface 360 transmits the first, second, and third preprocessing conditions, generated by the first artificial neural network 310, to the preprocessing modules 321, 322 and 323 outside the computing system 300.

FIG. 7 is a diagram showing the training/learning process of an image analysis apparatus using machine learning-based artificial intelligence according to an embodiment of the present invention.

In FIG. 7, the image analysis module 130 of FIG. 1 is replaced with a second artificial neural network 430.

Referring to FIG. 7, since the configurations in the based on a training input image 470, a reception interface 450, a first artificial neural network 410, a first preprocessing module 421, a second preprocessing module 422, a third preprocessing module 423, a second artificial neural network 430, and an objective function logic 440 form a feedback loop and the first artificial neural network 410 and the second artificial neural network 430 perform training/learning for a correlation between the training input image 470 and the result of the reference analysis of the training input image together are the same as those in the embodiment of FIG. 1, redundant descriptions thereof will be omitted below.

The second artificial neural network 430 may participate in the training/learning process of the first artificial neural network 410, and the first artificial neural network 410 and the second artificial neural network 430 may undergo training/learning together. In this case, descriptive information about the operation principle of the second artificial neural network 430 may be partially generated by the first artificial neural network 410. Generally, the inside of the second artificial neural network 430 is close to a black box, and thus the internal operation thereof may not be seen from the outside. However, the first artificial neural network 410 performs training/learning together and generates preprocessing conditions, and externally, the preprocessing conditions may be used as a means to partially understand the process of solving the problem by the second artificial neural network 430.

FIG. 8 is a diagram showing an inference process using the image analysis device of FIG. 7.

In FIG. 8, since the operations in which a reception interface 450 receives an input image 472, a first artificial neural network 410 generates first, second, and third preprocessing conditions based on the input image 472, reprocessing modules 421, 422 and 423 generate first, second, and third preprocessed images, respectively, by applying the first, second, and third preprocessing conditions to the input image 472, and an image analysis module 430 receives the first, second, and third preprocessed images and derives an image analysis result through inference as an image analysis result for the input image 472 are similar to the operations described in FIG. 2, redundant descriptions thereof will be omitted below.

According to the embodiments of FIGS. 7 and 8, the artificial neural network and the window-level preprocessing modules undergo learning together during a learning process, and thus the performance of the preprocessing modules and the artificial neural network may be improved to derive a window level that is highly related to a task performed by the artificial neural network.

According to the embodiments of FIGS. 1 to 8, the completeness of an automated preprocessing process may be increased by optimizing a process of preprocessing the window level of an input image for image analysis modules.

According to the embodiments of FIGS. 1 to 8, there may be provided image preprocessing conditions capable of improving the performance of an image analysis module or an image analysis artificial neural network.

According to the embodiments of FIGS. 1 to 8, there may be provided a preprocessing process in which a window level obtained by an automated preprocessing process for a medical image is optimized to such an extent as to clinically have a positive effect on diagnosis.

According to the embodiments of FIGS. 1 to 8, there may be provided a preprocessed image set capable of improving the performance of an image analysis module or an image analysis artificial neural network.

According to the embodiments of FIGS. 1 to 8, as descriptive information that allows a process in which an image analysis artificial neural network solves a problem inside to be understood from the outside, there may be derived preprocessing conditions suitable for an image analysis artificial neural network to solve the problem. Furthermore, according to the present invention, a process in which the image analysis artificial neural network solves a problem based on the derived preprocessing conditions may be at least partially described.

According to the embodiments of FIGS. 1 to 8, the present invention is not limited to simply analyzing a heat map derived from the analysis process of an image analysis artificial neural network and deriving descriptive information unlike conventional techniques, there may be observed the effect of the result derived by a generative artificial neural network of the present invention on the analysis process of the image analysis artificial neural network, thereby generating reliable descriptive information through the verification of the result of the intervention of the descriptive information.

As in the embodiments of FIGS. 1 to 6, the present invention may be practiced by adding on the first artificial neural network 110, 210 or 310 of the present invention for the purpose of boosting the performance of an existing computer-aided diagnosis (CAD) artificial neural network (in a state in which training/learning has been completed). In this case, the first artificial neural network 110, 210 or 310 of the present invention may boost the performance of the existing CAD model, or may generate descriptive information so that internally, separation into a plurality of tasks is performed and then the tasks are performed in practice when the existing CAD model performs analysis on a medical image.

According to the embodiments of FIGS. 7 and 8, when a new CAD model is designed, the present invention may be utilized as a means for developing a CAD model having improved performance by training a new CAD model and the first artificial neural network 410 of the present invention together.

Although an example in which three preprocessing modules are provided is shown in the embodiments of FIGS. 7 to 8, the spirit of the present invention is not limited to the embodiments. It will be apparent to those skilled in the art based on the disclosure of the present invention that a different number of preprocessing modules may be used according to the characteristics of a given task.

In the embodiments of FIGS. 1 to 8, the first generative artificial neural network may be implemented using a convolutional neural network or a combination of a feature extracter and a parameter generator. However, this example does not limit the spirit of the present invention, and any generative artificial neural network capable of generating windowing conditions through training will be applicable to the configuration of the present invention.

Figure 9:
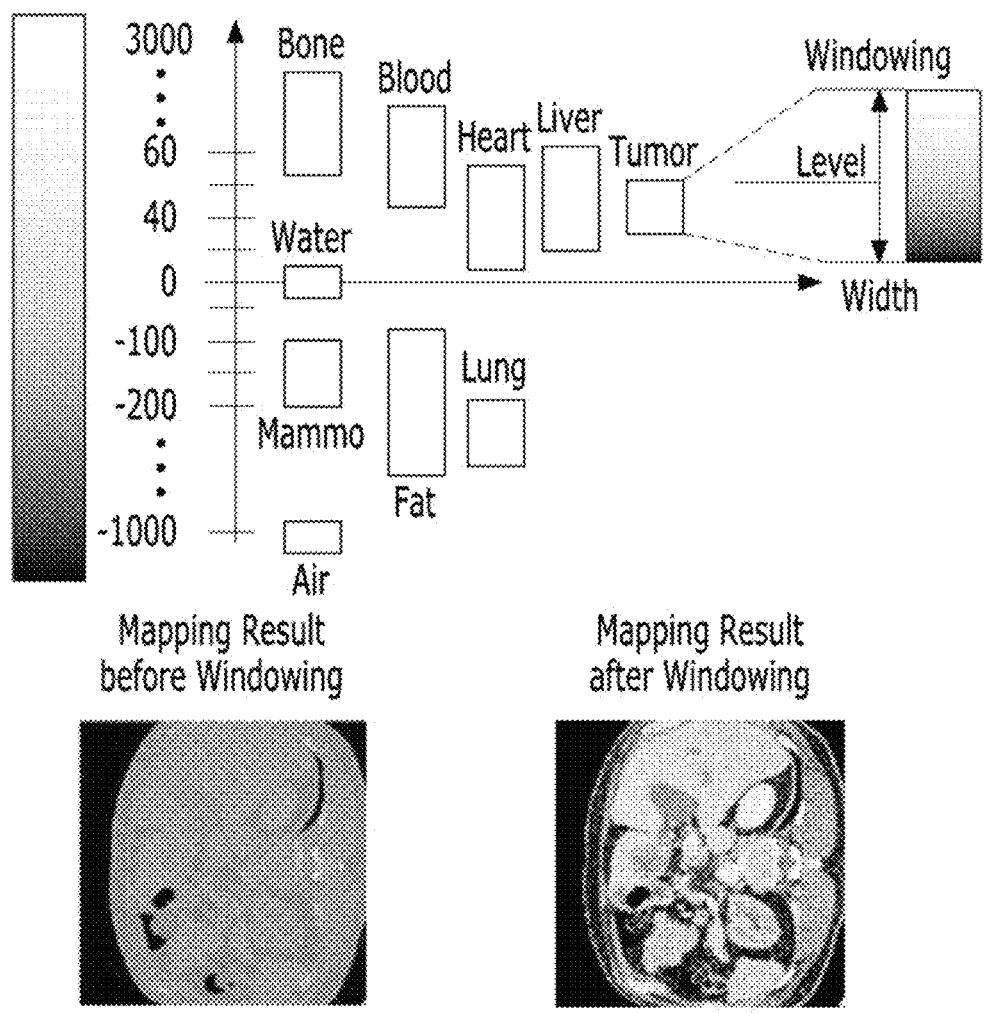
FIG. 9 is a diagram illustrating a CT windowing process constituting a part of the present invention.

FIG. 9 is a diagram illustrating a CT windowing process constituting a part of the present invention.

Recently, in a state in which interest in the automation of lesion identification using medical images has been increased, it is known that a brightness value that appears in images, such as CT or MRI images, varies depending on each organ in the human body. In the case of CT images, it is well known that the Hounsfield unit normalization process is very important in the reading of medical images.

Referring to FIG. 9, the ranges of Hounsfield values that bone, blood, heart, liver, tumor, mammo, fat, and lung organs, general water, and air have in CT images are illustrated.

Although a CT image before windowing is displayed such that it is not easy to distinguish each organ with the naked eye, a CT image after windowing may be expressed such that it is easy to distinguish each organ with the naked eye. In this case, the windowing condition may be described using a central level and a width or using upper and lower limits. This windowing condition is intended to observe only desired information excluding unwanted information. For example, in the case of the observation of the liver, a windowing condition may be set and executed in order to mainly analyze differences in the brightness of the liver region, excluding the brightness ranges of bone and fat regions.

Meanwhile, although CT is described as an example in FIG. 9, the present invention may be applied to MRI or other modalities, and the windowing condition may be modified and applied according to the modality to which the invention is applied.

FIG. 10 is a diagram showing an example of windowed images generated by a plurality of windowing preprocessing modules according to an embodiment of the present invention.

First window images 1021 are generated under a first preprocessing condition, second window images 1022 are generated under a second preprocessing condition, and third window images 1023 are generated under a third preprocessing condition. In this case, the first preprocessing condition, the second preprocessing condition, and the third preprocessing condition are different from each other, and thus the results of the visualization of the first window images 1021, the second window images 1022, and the third window images 1023 generated for the same input image have subtle differences. An image analysis module or an image analysis artificial neural network may improve the performance of image analysis by the combination of the first window images 1021, the second window images 1022, and the third window images 1023.

Figure 11:
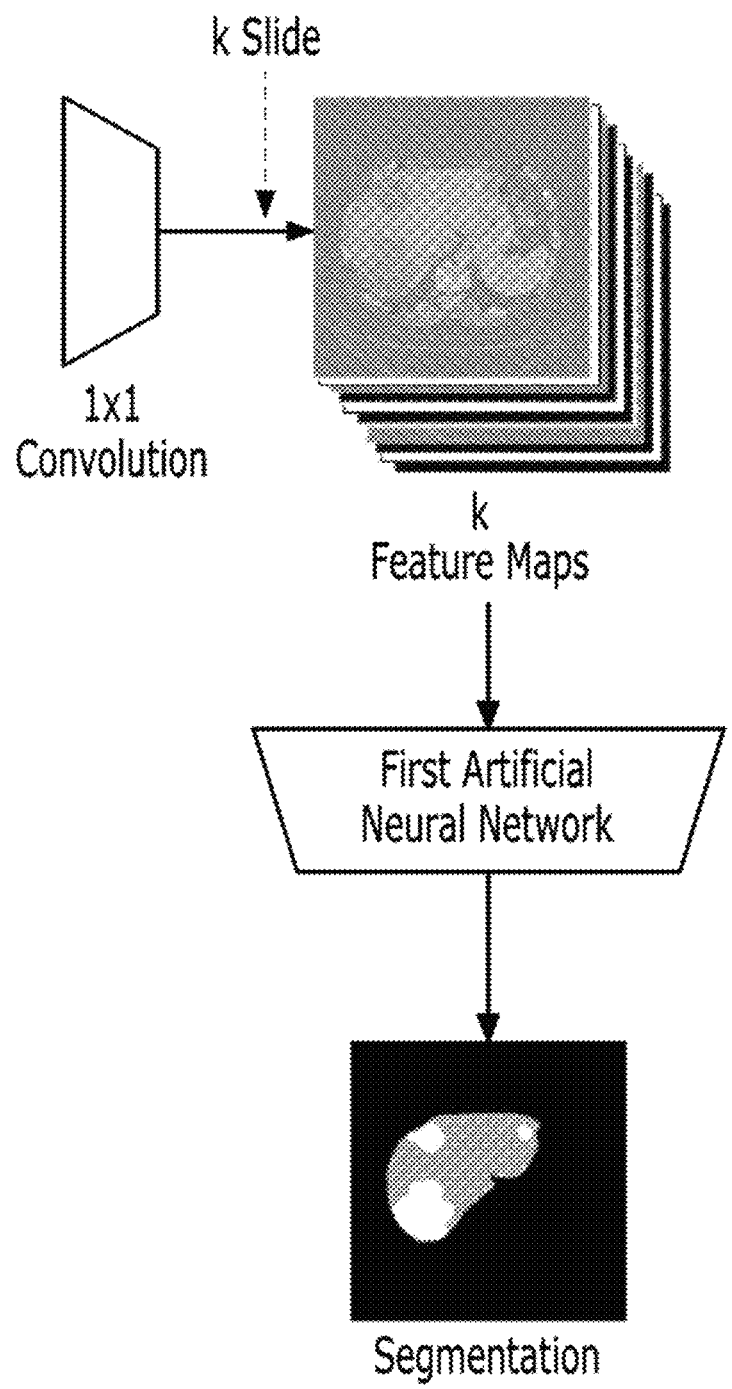
FIG. 11 is a diagram showing a preprocessed data generation process for effectively supporting image analysis in an image preprocessing and/or image analysis apparatus according to an embodiment of the present invention.

FIG. 11 is a diagram showing a preprocessed data generation process for effectively supporting image analysis in an image preprocessing and/or image analysis apparatus according to an embodiment of the present invention.

In embodiments of the present invention, preprocessed images may be directly input to the image analysis module or the image analysis artificial neural network, but may be input to the image analysis module or the image analysis artificial neural network after passing through an additional preprocessing process as shown in FIG. 11.

Referring to FIG. 11, there is performed a secondary preprocessing process of generating k feature maps from k slides by performing a convolution on primarily preprocessed (windowed) images. The k feature map images generated by the secondary preprocessing process are input to the task module that performs image analysis. In this case, although a case in which the task module performs segmentation is illustrated as an example in FIG. 11, the task module may perform detection, diagnosis, quantification, analysis, or a combination thereof in another embodiment of the present invention.

Figure 12:
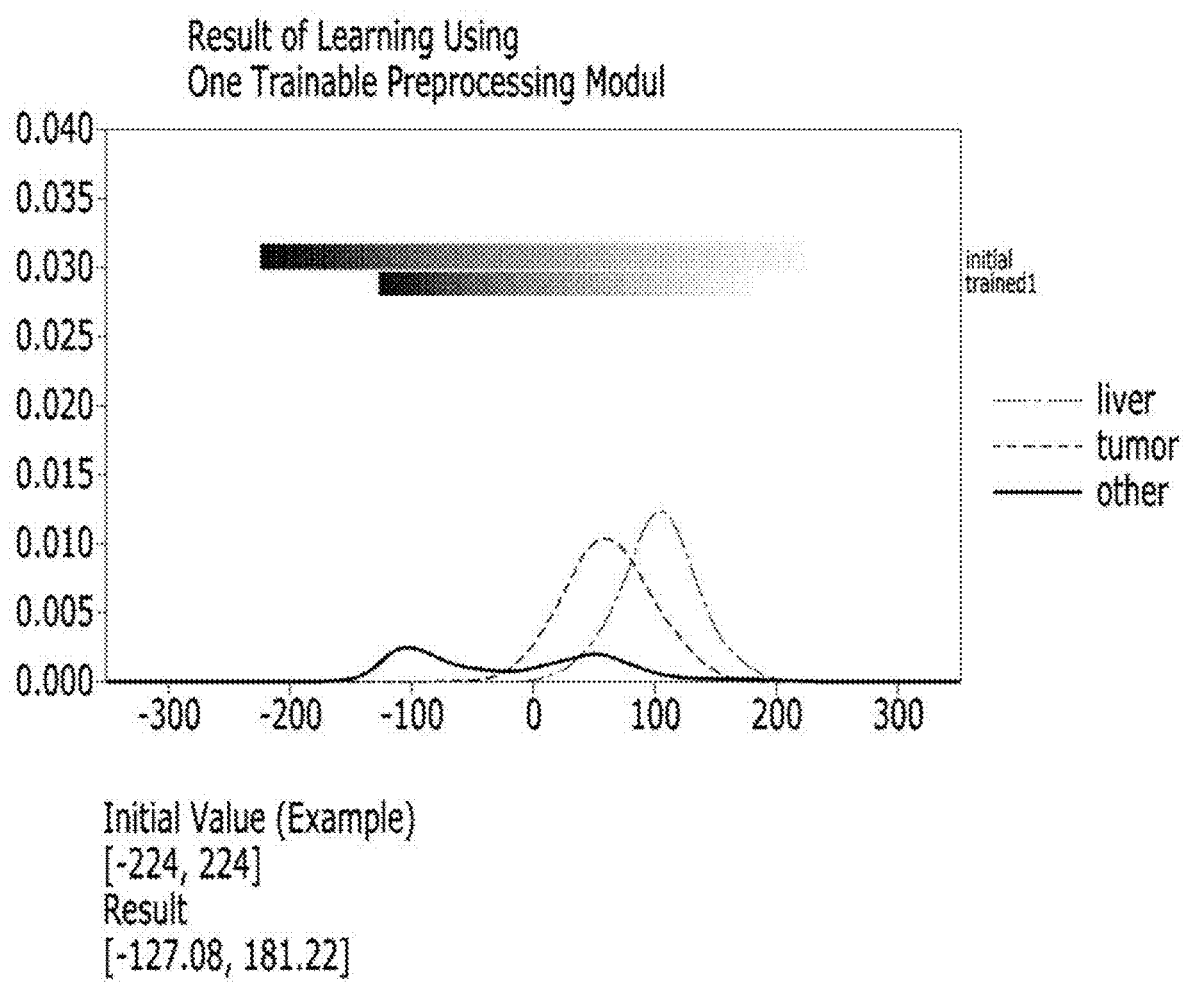
FIG. 12 is a diagram showing results obtained when an artificial neural network using one preprocessing condition detected liver and liver tumor regions as a comparative example of the present invention.

FIG. 12 is a diagram showing results obtained when an artificial neural network using one preprocessing condition detected liver and liver tumor regions as a comparative example of the present invention.

In FIG. 12, an initial condition may be a preprocessing windowing criterion for liver tumor diagnosis that is generally used in medical institutions. When training is performed using one preprocessing module, the range of a windowing condition tends to be narrower than the initial condition. However, in this case, it may be difficult to accurately diagnose the cause of the phenomenon that the windowing condition appears.

Figure 13:
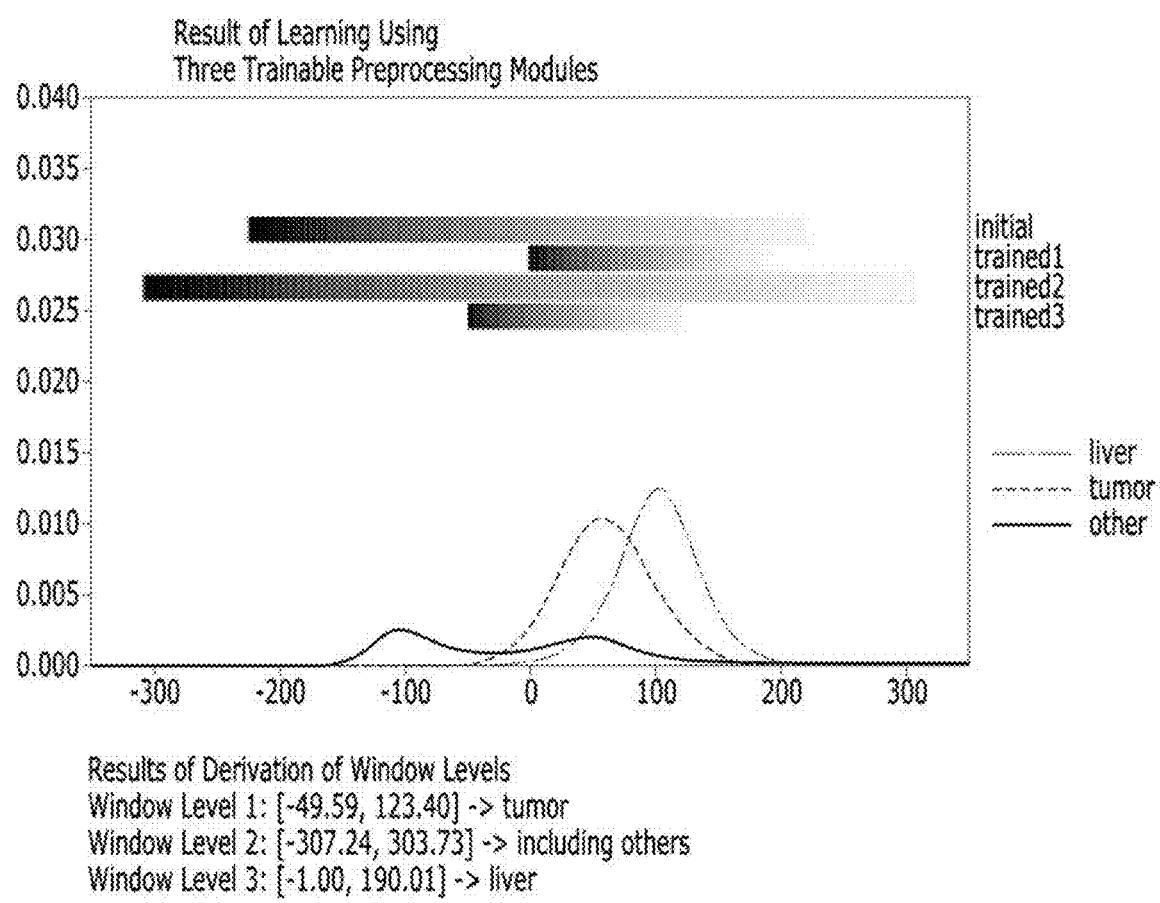
FIGS. 13 and 14 are diagrams showing the results of the detection of liver and liver tumor regions using a network structure in which a plurality of preprocessing modules and an artificial neural network are trained together as embodiments of the present invention.
Figure 14:
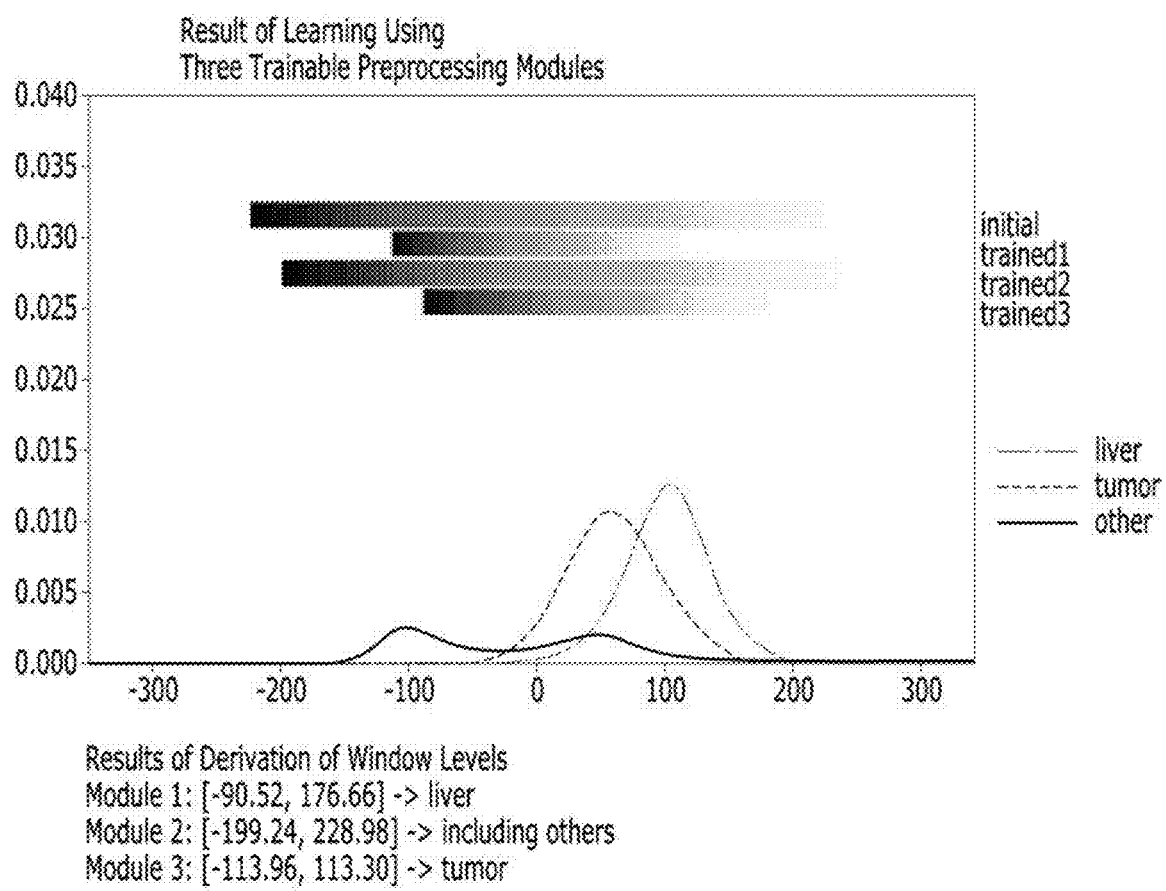

FIGS. 13 and 14 are diagrams showing the results of the detection of liver and liver tumor regions using a network structure in which a plurality of preprocessing modules and an artificial neural network are trained together as embodiments of the present invention.

In FIG. 13, it can be seen that as a result of training performed by starting training under a first initial condition and applying the concept of the present invention, the training has been performed such that in the task of distinguishing between a liver and a liver tumor, a first preprocessing condition is similar to the window level of a tumor, a second preprocessing condition is a condition representative of surrounding living tissues including a liver and a liver tumor and a third preprocessing condition is similar to the window level of a healthy liver.

In this case, the generative artificial neural network of the present invention may indirectly determine that an artificial neural network for analysis is performing at least two sub-tasks of identifying a healthy liver and a liver tumor, respectively, in order to perform the above corresponding task. Second preprocessing conditions converge into a wider range that identifies surrounding organs in addition to both a healthy liver and a liver tumor. This is very similar to the windowing condition that humans set to recognize surrounding areas with the naked eye. Similarly, it may also be indirectly determined that the image analysis artificial neural network uses a windowing condition similar to the windowing condition, under which humans perform recognition with the naked eye, in order to recognize surrounding context information.

In general, it will be understood that in order to perform the task of distinguishing between a liver and a liver tumor, an artificial neural network requires a windowing condition including the surroundings of a target, such as the second preprocessing condition, as a means for determining context.

In the embodiment of FIG. 14, the initial values of windowing conditions are slightly different from those of FIG. 13, but results are substantially the same as or similar to those of FIG. 13.

In FIG. 14, the first preprocessing condition corresponds to the windowing range of a healthy liver, and the third preprocessing condition corresponds to the windowing range of a liver tumor. The second preprocessing condition corresponds similarly to the initial windowing condition covering both a liver and a liver tumor. As a result, even when the initial values of FIGS. 13 and 14 are set to slightly different values, results are very similar to each other, suggesting that the present invention derives robust results even under various conditions.

Figure 15:
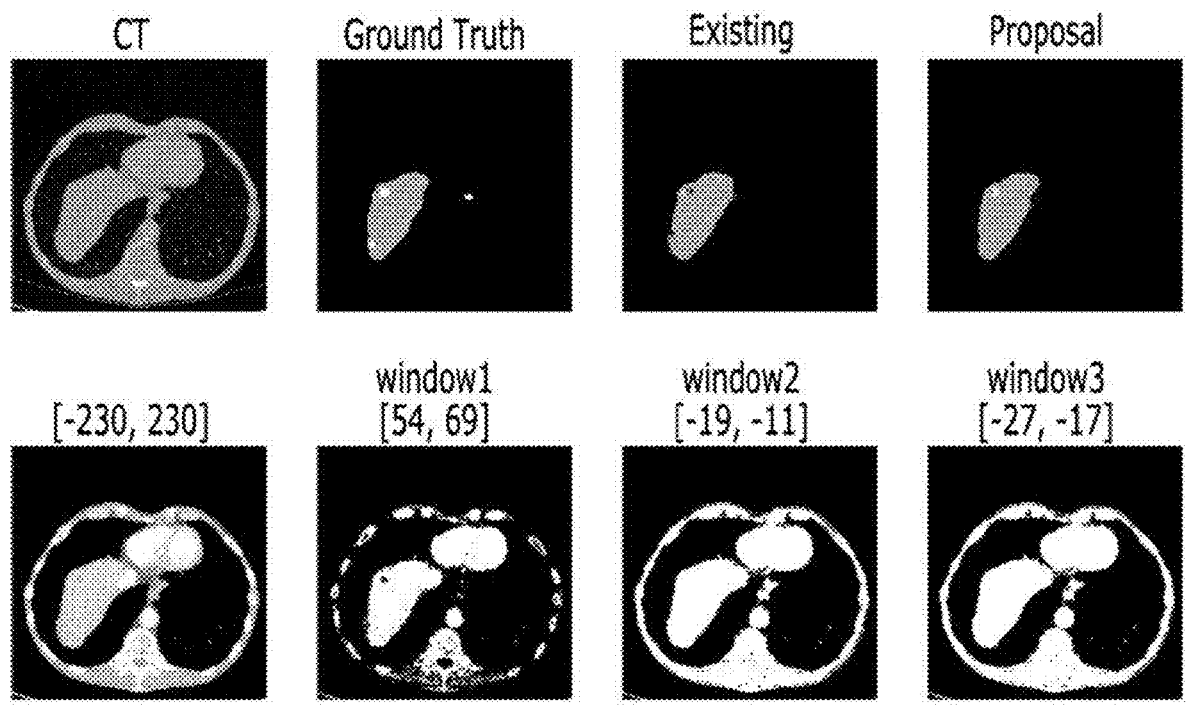
FIGS. 15 and 16 are diagrams showing the results of the detection of liver and liver tumor regions using a network structure in which a plurality of preprocessing module and an artificial neural network are trained along with an image analysis module in still another embodiment of the present invention.

FIG. 15 is a diagram showing an example of a process in which the first artificial neural network 110 trained in the embodiment of FIG. 1 receives a new input image 172 and generates preprocessed images in the embodiment of FIG. 2.

In the CT image, which is the input image 172, the ground truth, which is a reading result obtained by the diagnosis of a human expert, and an existing reading result of the image analysis module 130, i.e., Existing, are displayed in FIG. 15. It is assumed that the training of the image analysis module 130 has been completed and thus parameters are fixed.

The first artificial neural network 110 of the present invention forms a feedback loop along with the image analysis module 130 and learns preprocessing conditions capable of improving the performance of the image analysis module 130 through training. The images windowed using the preprocessing conditions generated by the first artificial neural network 110 are shown in FIG. 15.

Furthermore, a result obtained when the windowed, processed preprocessed images are input to the fixed image analysis module 130 is displayed as a Proposal. In the case where the image analysis module 130 received preprocessed images based on the preprocessing conditions of the first artificial neural network 110 and operated, it was possible to successfully detect a region that could not be detected when the image analysis module 130 received a [−230, 230]-windowed CT image and operated alone.

The windowing conditions derived by the first artificial neural network 110 for the CT image and image analysis module 130 are [54, 69], [−19, −11], and [−27, −17], and are conditions that are optimized to identify and detect specific organs within the corresponding CT image. Accordingly, these windowing conditions are results obtained in such a manner that the first artificial neural network 110 learns the process in which the image analysis module 130 analyzes CT images, and the process in which the image analysis module 130 analyzes CT images may be used as descriptive information that can be viewed from the outside through the artificial neural network 110.

Furthermore, it can be seen from FIG. 15 that the first artificial neural network 110 may generate windowing images capable of further improving the performance of the image Furthermore analysis module 130 in which the learning has already been completed and thus parameters are fixed.

Figure 16:
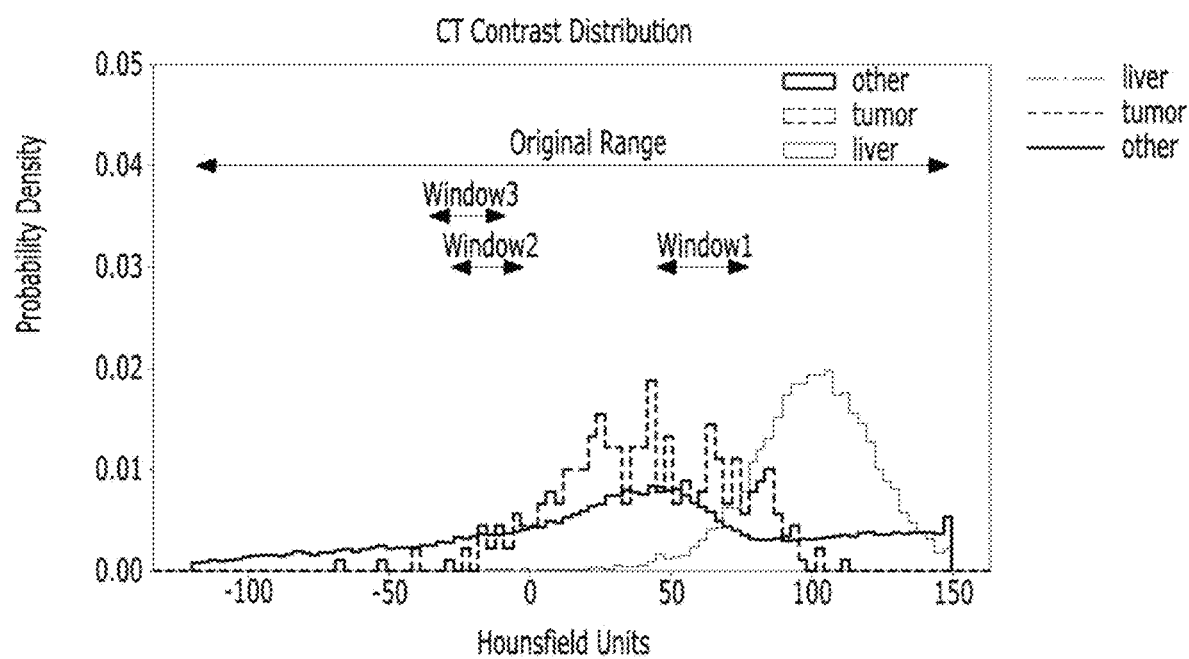

FIG. 16 is a diagram showing the window parameters derived in FIG. 15 and generated by the first artificial neural network 110 together with the distribution of the Hounsfield unit values of an input CT image.

Referring to FIG. 16, there are shown the distributions (Others, Tumor, and Liver) of the contrast values of the CT image input in the example shown in FIG. 15 and Hounsfield unit ranges (Window1, Window2, and Window3) obtained from the preprocessing parameters that are generated by the first artificial neural network 110 when the CT image is input.

Referring to FIG. 16, the Hounsfield unit range of CT images used for the training of the existing image analysis module 130 is [−230, 230], and includes the wide ranges of the Hounsfield units of a liver, a liver tumor, and other tissues.

In contrast, the Hounsfield unit ranges (Window1, Window2, and Window3) obtained from the preprocessing parameters generated by the first artificial neural network 110 are sensitively specialized to a boundary value between a liver and liver tumor tissues, and are thus specialized in distinguishing the distributions of the contrast values of the liver and the liver tumor (in the case of Window1) or in distinguishing between liver tumor tissues and other tissues (in the case of Window2 and Window3).

From FIG. 16, it can be understood that the first artificial neural network 110 focuses and provides the Hounsfield unit ranges optimized for the existing image analysis module 130 to distinguish regions from each other, and removes unnecessary contrast ranges, thereby improving the performance of the existing image analysis module 130.

The image preprocessing, analysis support, and/or analysis method using machine learning-based artificial intelligence according to an embodiment of the present invention may be implemented in the form of program instructions executable via various computer means, and may be then recorded in a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. These hardware devices may be configured to operate as one or more software modules in order to perform the operation of the present invention, and the vice versa.

However, the present invention is not limited to the embodiments. Like reference symbols in the drawings designate like components. The lengths, heights, sizes, widths, etc. introduced in the embodiments and drawings of the present invention may be exaggerated to help to understand.

According to the present invention, there may be provided the image analysis technique capable of the segmentation, detection and even diagnosis of a lesion that may be missed when the lesion is read with the naked eye by improving the performance of the automated image analysis technique.

According to the present invention, there may be implemented the image analysis technique capable of providing clinically meaningful information to a medical professional as descriptive information (explanation) about image analysis, segmentation, detection, and diagnosis results.

According to the present invention, the completeness of the automated preprocessing process may be improved by optimizing the process of preprocessing the window levels of an image.

According to the present invention, there may be provided the image preprocessing conditions capable of improving the performance of the image analysis module or the image analysis artificial neural network.

According to the present invention, there may be provided the preprocessing process in which window levels obtained by the automated preprocessing process for medical images are clinically optimized to have a positive effect on diagnosis.

According to the present invention, there may be provided the preprocessed image set capable of improving the performance of the image analysis module or the image analysis artificial neural network.

According to the present invention, the image analysis artificial neural network and the window level preprocessing module may be trained together in a learning process and the performance of both the preprocessing module and the artificial neural network may be improved such that window levels highly related to a task performed by the artificial neural network can be obtained.

According to the present invention, the plurality of preprocessing modules may be designed to operate independently of each other and in parallel so that robustness can be ensured against the influence of the designation of an initial value on diagnosis accuracy and the problem of not finding a global optimum due to a local optimum.

According to the present invention, the preprocessing conditions suitable for an image analysis artificial neural network to solve a problem may be derived as descriptive information that allows a process in which the image analysis artificial neural network internally solves the problem to be understood from the outside. Furthermore, according to the present invention, the process in which the analysis artificial neural network solves the problem may be at least partially explained based on the preprocessing conditions.

According to the present invention, the present invention is not limited to deriving descriptive information by simply analyzing a heat map or the like derived in the analysis process of an artificial neural network, unlike the conventional technologies, but may allow the effect of results, obtained by the generative artificial neural network of the present invention, on the analysis process of the artificial neural network to be observed, thereby enabling reliable descriptive information to be generated through the verification of the results.

Although the present invention has been described with reference to specific details such as the specific components, and the limited embodiments and drawings, these are provided merely to help a general understanding of the present invention, and the present invention is not limited thereto. Furthermore, those having ordinary skill in the technical field to which the present invention pertains may make various modifications and variations from the above detailed description.

Therefore, the spirit of the present invention should not be defined based only on the described embodiments, and not only the attached claims but also all equivalent to the claims should be construed as falling within the scope of the spirit of the present invention.

What is claimed is:

1. An image preprocessing apparatus using machine learning-based artificial intelligence, the image preprocessing apparatus comprising a computing system, the computing system comprising:
   a processor;
   a communication interface configured to receive an input image; and
   an artificial neural network configured to generate a first preprocessing condition and a second preprocessing condition through inference on the input image, wherein the first preprocessing condition has first descriptive information regarding a first task for processing a first task-specified part of the input image and the second preprocessing condition has second descriptive information regarding a second task for processing a second task-specified part of the input image, wherein the second task-specified part is a tissue region of a different organ from the first task-specified part, or a lesion of a same organ as the first task-specified part whereas the first task-specified part is a healthy tissue region of the same organ,
   wherein the processor comprises:
      a first preprocessing module configured to generate a first preprocessed image by applying the first preprocessing condition to the input image; and
      a second preprocessing module configured to generate a second preprocessed image by applying the second preprocessing condition to the input image, and
   wherein the processor is configured to control the first preprocessing module, the second preprocessing module, the artificial neural network, and the communication interface so that the first preprocessed image and the second preprocessed image are transferred to an image analysis module configured to perform image analysis on the input image based on the first preprocessed image and the second preprocessed image.

2. The image preprocessing apparatus of claim 1, wherein the processor is further configured to:
   transfer feedback of an objective function output of the image analysis module and the training input image to the artificial neural network so that the artificial neural network and the image analysis module train together for a correlation between the training input image and a result of an analysis of the training input image; and
   control the artificial neural network and the image analysis module so that the artificial neural network trains along with the image analysis module.

3. The image preprocessing apparatus of claim 1, wherein the computing system further comprises the image analysis module.

4. The image preprocessing apparatus of claim 1, wherein the communication interface is further configured to transmit the first preprocessed image and the second preprocessed image to the image analysis module outside the computing system,
   wherein the communication interface receives the training input image and feedback of an objective function output of the image analysis module and transfers them to the artificial neural network so that the artificial neural network and the image analysis module train together for a correlation between the training input image and the result of the analysis of the training input image, and
   wherein the processor controls the artificial neural network so that the artificial neural network trains along with the image analysis module, and controls the image analysis module via the communication interface.

5. The image preprocessing apparatus of claim 1, wherein the first preprocessing condition is a first window level including information about first upper and lower limits of brightness values of the input image regarding the first task detecting a healthy part, and
   wherein the second preprocessing condition is a second window level including information about second upper and lower limits of brightness values of the input image regarding the second task detecting an unhealthy part.

6. The image preprocessing apparatus of claim 1, wherein the input image is an image acquired by a modality including at least one of X-ray imaging, computed tomography (CT), magnetic resonance imaging (MRI), ultrasonic imaging, positron emission tomography (PET), and single photon emission computed tomography (SPECT).

7. The image preprocessing apparatus of claim 1, wherein the image analysis module is a module configured to perform a task including at least one of image segmentation, object detection, diagnosis, quantification, and image analysis for the input image.

8. The image preprocessing apparatus of claim 1, wherein the artificial neural network generates a third preprocessing condition through inference on the input image,
   wherein the processor further comprises a third preprocessing module configured to generate a third preprocessed image by applying the third preprocessing condition to the input image, and
   wherein the processor controls the first preprocessing module, the second preprocessing module, the third preprocessing module, the artificial neural network, and the communication interface so that the first preprocessed image, the second preprocessed image, and the third preprocessed image are transferred to the image analysis module.

9. The image preprocessing apparatus of claim 1, wherein the first and second preprocessing modules are further configured to operate independently of each other.

10. The image preprocessing apparatus of claim 1, wherein the processor is further configured to provide the first and second preprocessing conditions to a user as descriptive information about at least one of the input image, the first preprocessed image, the second preprocessed image, the image analysis module, and the result of the analysis of the input image obtained by the image analysis module.

11. An image analysis support apparatus using machine learning-based artificial intelligence, the image analysis support apparatus comprising a computing system, the computing system comprising:
   a processor;
   a communication interface configured to receive an input image; and
   an artificial neural network configured to generate a first preprocessing condition and a second preprocessing condition through inference on the input image, wherein the first preprocessing condition has first descriptive information regarding a first task for processing a first task-specified part of the input image and the second preprocessing condition has second descriptive information regarding a second task for processing a second task-specified part of the input image, wherein the second task-specified part is a tissue region of a different organ from the first task-specified part, or a lesion of a same organ as the first task-specified part whereas the first task-specified part is a healthy tissue region of the same organ, wherein the processor is configured to control the artificial neural network and the communication interface so that the first preprocessing condition is transferred to a first preprocessing module configured to generate a first preprocessed image by applying the first preprocessing condition to the input image and the second preprocessing condition is transferred to a second preprocessing module configured to generate a second preprocessed image by applying the second preprocessing condition to the input image, and wherein the processor is further configured to control, via the communication interface, the first preprocessing module, the second preprocessing module, and an image analysis module configured to perform image analysis on the input image based on the first preprocessed image and the second preprocessed image so that the first preprocessed image and the second preprocessed image are transferred to the image analysis module.

12. The image analysis support apparatus of claim 11, wherein the processor is further configured to:

transfer feedback of an objective function output of the image analysis module and the training input image to the artificial neural network so that the artificial neural network and the image analysis module train together for a correlation between the training input image and a result of an analysis of the training input image; and control the artificial neural network and the image analysis module so that the artificial neural network trains along with the image analysis module.

13. The image analysis support apparatus of claim 11, wherein the first preprocessing condition is a first window level including information about first upper and lower limits of brightness values of the input image regarding the first task detecting a healthy part, and wherein the second preprocessing condition is a second window level including information about second upper and lower limits of brightness values of the input image regarding the second task detecting an unhealthy part.

14. The image analysis support apparatus of claim 11, wherein the processor is further configured to provide the first and second preprocessing conditions to a user as descriptive information about at least one of the input image, the first preprocessed image, the second preprocessed image, the image analysis module, and a result of an analysis of the input image obtained by the image analysis module.

15. An image analysis apparatus using machine learning-based artificial intelligence, the image analysis apparatus comprising a computing system, the computing system comprising:

a processor;

a communication interface configured to receive an input image;

a first artificial neural network configured to generate a first preprocessing condition and a second preprocessing condition through inference on the input image, wherein the first preprocessing condition has first descriptive information regarding a first task for processing a first task-specified part of the input image and the second preprocessing condition has second descriptive information regarding a second task for processing a second task-specified part of the input image, wherein the second task-specified part is a tissue region of a different organ from the first task-specified part, or a lesion of a same organ as the first task-specified part whereas the first task-specified part is a healthy tissue region of the same organ; and a second artificial neural network configured to generate a result of an analysis of the input image by performing image analysis on the input image, wherein the processor comprises:

a first preprocessing module configured to generate a first preprocessed image by applying the first preprocessing condition to the input image; and a second preprocessing module configured to generate a second preprocessed image by applying the second preprocessing condition to the input image, and wherein the processor is configured to control the first preprocessing module, the second preprocessing module, the first artificial neural network, the second artificial neural network, and the communication interface so that the first and second preprocessed images are transferred to the second artificial neural network and the second artificial neural network generates the result of the analysis of the input image based on the first and second preprocessed images.

16. The image analysis apparatus of claim 15, wherein the processor is further configured to:

transfer feedback of an objective function output of the second artificial neural network and the training input image to the first artificial neural network so that the first and second artificial neural networks train together for a correlation between the training input image and the result of the analysis of the training input image; and control the first and second artificial neural networks so that the first artificial neural network trains along with the second artificial neural network.

17. The image analysis apparatus of claim 15, wherein the first preprocessing condition is a first window level including information about first upper and lower limits of brightness values of the input image regarding the first task detecting a healthy part, and wherein the second preprocessing condition is a second window level including information about second upper and lower limits of brightness values of the input image regarding the second task detecting an unhealthy part.

18. The image analysis apparatus of claim 15, wherein the second artificial neural network is an artificial neural network configured to perform a task including at least one of image segmentation, object detection, diagnosis, quantification, and image analysis for the input image.

19. The image analysis apparatus of claim 15, wherein the processor is further configured to provide the first and second preprocessing conditions to a user as descriptive information about at least one of the input image, the first preprocessed image, the second preprocessed image, and the result of the analysis of the input image obtained by the second artificial neural network.

* * * * *